(12) United States Patent
Shinohara

(10) Patent No.: US 7,664,385 B2
(45) Date of Patent: Feb. 16, 2010

(54) IMAGE CAPTURE DEVICE AND ASSOCIATED METHOD OF COMPENSATING BACKLASH

(75) Inventor: Junichi Shinohara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 948 days.

(21) Appl. No.: 10/870,141

(22) Filed: Jun. 18, 2004

(65) Prior Publication Data

US 2005/0012846 A1      Jan. 20, 2005

(30) Foreign Application Priority Data

Jul. 2, 2003      (JP)      ............................. 2003-190238

(51) Int. Cl.
G03B 3/10      (2006.01)
G03B 13/34      (2006.01)
G03B 13/00      (2006.01)
H04N 5/232      (2006.01)

(52) U.S. Cl. ........................ 396/134; 348/345; 348/347

(58) Field of Classification Search ................ 348/345, 348/357; 396/134
See application file for complete search history.

(56) References Cited

U.S. PATENT DOCUMENTS

| | | | |
|---|---|---|---|
| 3,816,651 A * | 6/1974 | Gardner ...................... 348/349 |
| 4,881,799 A * | 11/1989 | Ohno et al. ................. 359/698 |
| 5,008,605 A * | 4/1991 | Ohara et al. ................ 318/630 |
| 5,070,356 A | 12/1991 | Nakamura et al. |
| 5,150,143 A | 9/1992 | Ohno et al. |
| 5,192,860 A | 3/1993 | Shinohara et al. |
| 5,192,964 A | 3/1993 | Shinohara et al. |
| 5,270,755 A | 12/1993 | Ohno et al. |
| 5,293,034 A | 3/1994 | Ohno et al. |
| 5,309,190 A | 5/1994 | Shinohara et al. |
| 5,463,442 A * | 10/1995 | Harigaya et al. .............. 396/85 |
| 5,640,225 A * | 6/1997 | Nakata ........................ 396/135 |
| 5,682,563 A | 10/1997 | Shinohara et al. |
| 5,724,194 A * | 3/1998 | Ishikawa ..................... 359/696 |
| 5,905,918 A * | 5/1999 | Nakamura et al. ............ 396/87 |
| 6,037,972 A * | 3/2000 | Horiuchi et al. ............... 348/64 |
| 6,282,379 B1 * | 8/2001 | Ide et al. ...................... 396/89 |
| 6,285,831 B1 * | 9/2001 | Hara ............................ 396/50 |
| 2002/0126210 A1 | 9/2002 | Shinohara et al. |
| 2003/0071911 A1 | 4/2003 | Shinohara et al. |
| 2003/0128290 A1* | 7/2003 | Toyofuku et al. ........... 348/364 |
| 2003/0165333 A1 | 9/2003 | Shinohara |
| 2003/0231291 A1 | 12/2003 | Kitajima et al. |

(Continued)

FOREIGN PATENT DOCUMENTS

JP      3-150536      6/1991

(Continued)

Primary Examiner—Albert H Cutler
(74) Attorney, Agent, or Firm—Oblon, Spivak, McClelland, Maier & Neustadt, L.L.P.

(57) ABSTRACT

An image capture device includes a focusing unit, a focus driving unit and an autofocus control unit; the focusing unit is provided to focus on a subject. The focus driving unit is provided for driving the focusing unit to driving-target position. The autofocus control unit is provided to control driving of the focus driving unit according to a determination of executing or omitting a one-way-driving-control. One-way driving control controls driving direction of the focus driving unit into a predetermined direction at a peripheral range before driving-disactivation of the focus driving means, determined based on a shooting-condition.

12 Claims, 16 Drawing Sheets

| SHOOTING-MODE | | DRAFT MODE | | | |
|---|---|---|---|---|---|
| INTERNAL TEMPERATURE | | NORMAL TEMPERATURE RANGE | | OUT OF NORMAL TEMPERATURE RANGE | |
| SHUTTER-RELEASE-OPERATION PATTERN | | ONE-STROKE-PRESS OPERATION | TWO-STROKES-PRESS OPERATION | ONE-STROKE-PRESS OPERATION | TWO-STROKES-PRESS OPERATION |
| AF OPERATION | RANGE-FINDING OK | EXTERNAL-METERING AF OPERATION | HYBRID AF OPERATION | EXTERNAL-METERING AF OPERATION | HYBRID AF OPERATION |
| | RANGE-FINDING NG | FIXED FOCUS POSITION | FULL-RANGE CCD-AF OPERATION | FIXED FOCUS POSITION | FULL-RANGE CCD-AF OPERATION |
| BACKLASH-REMOVING OPERATION | | OMIT | PROCESS | OMIT | PROCESS |
| | | (1) | (2) | (3) | (4) |

U.S. PATENT DOCUMENTS

2004/0100561 A1 5/2004 Shinohara et al.
2004/0263633 A1 12/2004 Shinohara et al.
2005/0200737 A1 9/2005 Shinohara et al.

FOREIGN PATENT DOCUMENTS

| JP | 5-11164 | 1/1993 |
| JP | 07-063973 | 3/1995 |
| JP | 2001-255456 | 9/2001 |
| JP | 2004-020893 | 1/2004 |

* cited by examiner

FIG. 8A

| SHOOTING-MODE | | DRAFT MODE | | | |
|---|---|---|---|---|---|
| INTERNAL TEMPERATURE | | NORMAL TEMPERATURE RANGE | | OUT OF NORMAL TEMPERATURE RANGE | |
| SHUTTER-RELEASE-OPERATION PATTERN | | ONE-STROKE-PRESS OPERATION | TWO-STROKES-PRESS OPERATION | ONE-STROKE-PRESS OPERATION | TWO-STROKES-PRESS OPERATION |
| AF OPERATION | RANGE-FINDING OK | EXTERNAL-METERING AF OPERATION | HYBRID AF OPERATION | EXTERNAL-METERING AF OPERATION | HYBRID AF OPERATION |
| | RANGE-FINDING NG | FIXED FOCUS POSITION | FULL-RANGE CCD-AF OPERATION | FIXED FOCUS POSITION | FULL-RANGE CCD-AF OPERATION |
| BACKLASH-REMOVING OPERATION | | OMIT | OMIT (PROCESS IF RANGE-FINDING IS NG) | OMIT | PROCESS |
| | | (1) | (2) | (3) | (4) |

FIG. 8B

| SHOOTING-MODE | NORMAL MODE | | | | | |
|---|---|---|---|---|---|---|
| INTERNAL TEMPERATURE | NORMAL TEMPERATURE RANGE | | | OUT OF NORMAL TEMPERATURE RANGE | | |
| SHUTTER-RELEASE-OPERATION PATTERN | ONE-STROKE-PRESS OPERATION | | TWO-STROKES-PRESS OPERATION | ONE-STROKE-PRESS OPERATION | | TWO-STROKES-PRESS OPERATION |
| AF OPERATION — RANGE-FINDING OK | EXTERNAL-METERING AF OPERATION | | HYBRID AF OPERATION | EXTERNAL-METERING AF OPERATION | | HYBRID AF OPERATION |
| AF OPERATION — RANGE-FINDING NG | FIXED FOCUS POSITION | | FULL-RANGE CCD-AF OPERATION | FIXED FOCUS POSITION | | FULL-RANGE CCD-AF OPERATION |
| BACKLASH-REMOVING OPERATION | OMIT | | PROCESS | PROCESS | | PROCESS |
| | (5) | | (6) | (7) | | (8) |

FIG. 9A

| SHOOTING-MODE | | DRAFT MODE | | | | |
|---|---|---|---|---|---|---|
| INTERNAL TEMPERATURE | | NORMAL TEMPERATURE RANGE | | | OUT OF NORMAL TEMPERATURE RANGE | |
| SHUTTER-RELEASE-OPERATION PATTERN | | ONE-STROKE-PRESS OPERATION | TWO-STROKES-PRESS OPERATION | | ONE-STROKE-PRESS OPERATION | TWO-STROKES-PRESS OPERATION |
| AF OPERATION | RANGE-FINDING OK | EXTERNAL-METERING AF OPERATION | HYBRID AF OPERATION | | EXTERNAL-METERING AF OPERATION | HYBRID AF OPERATION |
| | RANGE-FINDING NG | FIXED FOCUS POSITION | FULL-RANGE CCD-AF OPERATION | | FIXED FOCUS POSITION | FULL-RANGE CCD-AF OPERATION |
| BACKLASH-REMOVING OPERATION | | OMIT | OMIT | | OMIT | OMIT |
| | | (1) | (2) | | (3) | (4) |

FIG. 9B

| SHOOTING-MODE | NORMAL MODE | | | | |
|---|---|---|---|---|---|
| INTERNAL TEMPERATURE | NORMAL TEMPERATURE RANGE | | OUT OF NORMAL TEMPERATURE RANGE | | |
| SHUTTER-RELEASE-OPERATION PATTERN | ONE-STROKE-PRESS OPERATION | TWO-STROKES-PRESS OPERATION | ONE-STROKE-PRESS OPERATION | TWO-STROKES-PRESS OPERATION | |
| AF OPERATION — RANGE-FINDING OK | EXTERNAL-METERING AF OPERATION | HYBRID AF OPERATION | EXTERNAL-METERING AF OPERATION | HYBRID AF OPERATION | |
| AF OPERATION — RANGE-FINDING NG | FIXED FOCUS POSITION | FULL-RANGE CCD-AF OPERATION | FIXED FOCUS POSITION | FULL-RANGE CCD-AF OPERATION | |
| BACKLASH-REMOVING OPERATION | PROCESS | PROCESS | PROCESS | PROCESS | |
| | (5) | (6) | (7) | (8) | |

FIG. 10A

| SHOOTING-MODE | | DRAFT MODE | | | | |
|---|---|---|---|---|---|---|
| INTERNAL TEMPERATURE | | NORMAL TEMPERATURE RANGE | | OUT OF NORMAL TEMPERATURE RANGE | | |
| SHUTTER-RELEASE-OPERATION PATTERN | | ONE-STROKE-PRESS OPERATION | TWO-STROKES-PRESS OPERATION | ONE-STROKE-PRESS OPERATION | TWO-STROKES-PRESS OPERATION | |
| AF OPERATION | RANGE-FINDING OK | EXTERNAL-METERING AF OPERATION | HYBRID AF OPERATION | EXTERNAL-METERING AF OPERATION | HYBRID AF OPERATION | |
|  | RANGE-FINDING NG | FIXED FOCUS POSITION | FULL-RANGE CCD-AF OPERATION | FIXED FOCUS POSITION | FULL-RANGE CCD-AF OPERATION | |
| BACKLASH-REMOVING OPERATION | | OMIT | OMIT | PROCESS | PROCESS | |
| | | (1) | (2) | (3) | (4) | |

FIG. 10B

| SHOOTING-MODE | NORMAL MODE | | | | | |
|---|---|---|---|---|---|---|
| INTERNAL TEMPERATURE | NORMAL TEMPERATURE RANGE | | OUT OF NORMAL TEMPERATURE RANGE | | | |
| SHUTTER-RELEASE-OPERATION PATTERN | ONE-STROKE-PRESS OPERATION | | TWO-STROKES-PRESS OPERATION | ONE-STROKE-PRESS OPERATION | | TWO-STROKES-PRESS OPERATION |
| AF OPERATION | RANGE-FINDING OK | EXTERNAL-METERING AF OPERATION | HYBRID AF OPERATION | EXTERNAL-METERING AF OPERATION | | HYBRID AF OPERATION |
| | RANGE-FINDING NG | FIXED FOCUS POSITION | FULL-RANGE CCD-AF OPERATION | FIXED FOCUS POSITION | | FULL-RANGE CCD-AF OPERATION |
| BACKLASH-REMOVING OPERATION | OMIT | OMIT | PROCESS | | PROCESS | |
| | (5) | (6) | (7) | | (8) | |

FIG. 11A

| SHOOTING-MODE | | DRAFT MODE | | | |
|---|---|---|---|---|---|
| INTERNAL TEMPERATURE | | NORMAL TEMPERATURE RANGE | | OUT OF NORMAL TEMPERATURE RANGE | |
| SHUTTER-RELEASE-OPERATION PATTERN | | ONE-STROKE-PRESS OPERATION | TWO-STROKES-PRESS OPERATION | ONE-STROKE-PRESS OPERATION | TWO-STROKES-PRESS OPERATION |
| AF OPERATION | RANGE-FINDING OK | EXTERNAL-METERING AF OPERATION | HYBRID AF OPERATION | EXTERNAL-METERING AF OPERATION | HYBRID AF OPERATION |
| | RANGE-FINDING NG | FIXED FOCUS POSITION | FULL-RANGE CCD-AF OPERATION | FIXED FOCUS POSITION | FULL-RANGE CCD-AF OPERATION |
| BACKLASH-REMOVING OPERATION | | OMIT | PROCESS | OMIT | PROCESS |
| | | (1) | (2) | (3) | (4) |

FIG. 11B

| SHOOTING-MODE | NORMAL MODE | | | | | | |
|---|---|---|---|---|---|---|---|
| INTERNAL TEMPERATURE | NORMAL TEMPERATURE RANGE | | | OUT OF NORMAL TEMPERATURE RANGE | | | |
| SHUTTER-RELEASE-OPERATION PATTERN | ONE-STROKE-PRESS OPERATION | | TWO-STROKES-PRESS OPERATION | ONE-STROKE-PRESS OPERATION | | TWO-STROKES-PRESS OPERATION | |
| AF OPERATION | RANGE-FINDING OK | EXTERNAL-METERING AF OPERATION | HYBRID AF OPERATION | EXTERNAL-METERING AF OPERATION | | HYBRID AF OPERATION | |
|  | RANGE-FINDING NG | FIXED FOCUS POSITION | FULL-RANGE CCD-AF OPERATION | FIXED FOCUS POSITION | | FULL-RANGE CCD-AF OPERATION | |
| BACKLASH-REMOVING OPERATION | | OMIT | PROCESS | OMIT | | PROCESS | |
| | | (5) | (6) | (7) | | (8) | |

IMAGE CAPTURE DEVICE AND ASSOCIATED METHOD OF COMPENSATING BACKLASH

BACKGROUND OF THE INVENTION

The present invention generally relates to an image capture device, such as a digital camera, and more specifically, to an image capture device having an autofocus assembly operative to diminish a backlash condition.

Conventionally, the image capture device, such as a still camera and a video camera employs an autofocus assembly to automatically adjust a focus condition of an optical image of a subject. The autofocus assembly arranged in a traditional image capture device has a range-finding unit that is configured to measure a distance between the subject and the device.

Additionally, the conventional device includes a focus driving unit that is arranged to drive a focusing lens group to the focusing position corresponding to the distance measured by the range-finding unit. This operation is called an external-metering AF (auto focus) operation. The external-metering AF employs two known methods of operation corresponding to different range-finding techniques. One is called a passive AF operation.

Currently, digital cameras are operative to project the optical image of the subject on the image pickup unit, such as a Charge Coupled Device CCD or a Complementary Metal Oxide Semiconductor-type image sensor, and convert the projected image into an electronic signal. Such devices obtain the image signals successively while controlling driving of the focusing lens group which is part of a shooting optical system; evaluate the contrast of the image projected onto the image pickup unit based on the image signal obtained, in real time; and control the focusing lens group to stop at a position that is evaluated as optimal. This auto focus operation is referred to as a CCD-AF operation or a contrast AF operation.

Though the CCD-AF operation provides high focusing precision, the CCD-AF operation also has two problems. The first problem is that necessary time to determine processing of the CCD-AF operation (i.e., necessary time to complete the AF operation) is relatively long. Likewise, the second problem is that a user cannot capture images before the completion of the AF operation, when the user wants to capture an image having objects that move at high speed. The CCD-AF operation may be not able to execute focusing movement adequately so that the image capture device cannot evaluate remarkable contrast of the image projected onto the image pickup unit, for example, in a dark condition having a decreased level of overall contrast. Conversely, the external-metering AF functions to focus on the subject comparatively well so that the necessary time (time-lag) for the AF operation is shorter than the CCD-AF operation. CCD-AF is not readily influenced by contrast of the subject; and the user can capture images the subject at desired timing.

A hybrid AF operation is proposed in Japanese Patent Publication of unexamined Application No. 2001-255456 gazette. This document describes a configuration to execute the CCD-AF operation at only a peripheral range according to the distance of the subject as detected by the range-finding unit. The hybrid AF operation arranged in the still camera is employed together with the external-metering AF operation using same general range-finding information measured by the range-finding unit. In this way, the user can capture images according to shooting conditions by switching the operation between the external-metering AF operation and the CCD-AF operation (including the hybrid AF operation) based on condition of the subject.

Backlash is present in order to smooth an interlocked driving between a driving member and a driven member at a coupling-part between the shooting optical system and a driving system for the shooting optical system. Specifically, backlash is a mechanical "slack" between movable elements of the optical system and movable elements of the driving system of the shooting optical system. Thus, backlash must be compensated to precisely control a position of the shooting optical system.

In other words, the shooting optical system of the digital camera as the image capture device is typically driven by a pulse motor, for instance, and a push-out (i.e., extended) position of the focusing lens group is configured according to a pulse-number applied to the pulse motor. Therefore, a stopping-position of the focusing lens group may have an accidental error in accordance with a driving direction (a push-out direction or a pull-back direction) from a current position of the focusing lens group toward the focusing position by hysteresis with backlash. This backlash occurs even if the predetermined pulse-number to drive the focusing lens group to the predetermined push-out position is applied to the pulse motor.

A method of addressing backlash is proposed on Japanese Patent Publication of unexamined Application No. 7-063973 gazette. A backlash removing operation is proposed to control the driving direction of the focusing lens group among predetermined range before disengaging the drive in the push-out direction. In other words, when the focusing lens is driven on the push-out direction that is not affected by the backlash, the focusing lens is stopped at driving-target position on the push-out direction. When focusing lens is driven on the pull-back direction that is affected by the backlash, the focusing lens is driven on the pull-back direction to a position beyond the driving-target position, the focusing lens group is turned over on the push-out direction to the driving-target position after reaching to the position; and is stopped. In this manner, the camera can cancel the backlash substantially by above-mentioned one-way-driving.

However, in a general case of the driving system of the focusing lens group having amount of the backlash defined as K; amount of outreached driving defined as Alpha; amount of the backlash-removing operation L defined as K+Alpha; the pulse-number corresponding to amount of the backlash-removing operation L defined as 10 pulses; and a pulse rate of the pulse motor defined as 700 pps, a pulse number for extra driving requires 20 pulses (i.e., 10 pulses*2 (both ways)) and operation time TB for extra driving requires almost 30 ms (i.e. 20 pulse/700 pps=28.6 ms). Also, when the operation time TT to turn over direction for the pulse motor is defined as almost 10 ms, total necessary time T (=TB+TT) for the backlash-removing operation becomes almost 40 ms.

Yet, when the above-mentioned backlash-removing operation is executed during the CCD-AF operation (including the hybrid AF operation), the increased time necessary to complete the CCD-AF operation is marginal so that necessary time for the CCD-AF operation is about 500-1000 ms. Thus, the CCD-AF operation takes more time in comparison with the external-metering AF operation. On the other hand, however, the user may feel that the focusing movement is sluggish so that the increased time necessary to complete external-metering AF operation is larger than the CCD-AF operation according to the shooting-condition, when the above-mentioned backlash-removing operation is executed during the external-metering AF operation

SUMMARY OF THE INVENTION

The present invention provides an image capture device in which a user can capture an image according to the shooting-condition so that improvement of focusing precision or improvement of focusing speed is given priority. The device selects processing or omission of a backlash-removing process according to shooting-conditions such as a selected shooting-mode, an internal temperature of the image capture device, an input-pattern of the shooting operation provided to an operation input unit such as a shutter release switch and type of AF operation.

The image capture device of the exemplary embodiment comprises a focusing unit, a focus driving unit and an autofocus control unit. The focusing unit, such as a shooting optical system or an image pickup unit, is configured for being driven in order to focus on a subject, for instance. The shooting optical system is configured to project an image corresponding to a subject internal to the image capture device, such as a lens system. The image pickup unit is configured to output an image signal corresponding to the subject, and performs photo-electric conversion. The focus driving unit is configured for driving the focusing unit up to a driving-target position. For example, the focus-driving unit that is configured to drive one of the shooting optical system and the image pickup unit relative to the other up to the driving-target position. The shooting optical system includes a movable lens such as a focusing lens group when the image pickup unit is fixed in position with respect to the apparatus. Otherwise, it is not necessarily the case that the shooting optical system includes a movable lens such as a focusing lens group. Thus, the focus driving unit drives a component for focusing on the subject, such as at least a part of the shooting optical system; at least a part of the image pickup unit; or both the shooting optical system and the image pickup unit. The autofocus control unit is configured for controlling driving of the focus driving unit according to determination of executing or omitting a one-way-driving-control. In this way, the autofocus control may control the driving direction of the focus driving unit into predetermined direction at a peripheral range before driving-disactivation of the focus driving unit and the above-mentioned determination to execute or omit this one-way driving-control is based on a shooting-condition. In particular, the autofocus control unit is configured to determine executing or omitting one-way-driving-control based on the shooting-condition, and the unit controls the focus-driving unit based on the determination. Any configuration of the AF operation, such as an external-metering AF operation and a CCD-AF operation including a so-called hybrid AF operation configured from a combination of a type of the AF operation, that can control driving of the focus driving unit to focus on the subject (i.e. in order to form the image that is focused corresponding to the subject on the image pickup unit), is consistent with the teachings disclosed herein.

The one-way-driving-control provides a backlash-removing operation. The selected shooting-mode, an internal temperature of the image capture device, an input-pattern of the shooting operation inputted to an operation input unit such as a shutter release switch and a type of an AF operation may be employed as the shooting-condition for determination of executing or omitting the one-way-driving-control. Also, it is acceptable that the shooting-condition is set by use operation or set by detection of the shooting-condition automatically.

In this manner, the image capture device of an exemplary embodiment of the present invention can switch between processing or omitting the backlash-removing operation according to the shooting-condition. Therefore, when it is in the shooting-condition demanding high-speed shutter-releasing response, the image capture device can shorten the necessary time for completion of the focusing operation. Otherwise, when in a shooting-condition requiring high-precision focusing as initiated by the user, the image capture device can improve the focusing precision and the user can capture images according to the shooting-condition.

The image capture device of a further embodiment of present invention comprises the focusing unit, the focus driving unit, a shooting-mode selecting unit and the autofocus control unit. The shooting-mode selecting unit is configured to select one of plurality of shooting-modes. The plurality of shooting modes include a sports mode, such as a draft mode and high-speed AF mode, suitable for shooting the subject moving such as an athlete, a portrait mode suitable for shooting the subject that is motionless, a distant landscape mode suitable for shooting a landscape, a night view mode suitable for shooting night view, a character mode suitable for shooting documents and other high-sensitivity modes. The autofocus control unit is configured for controlling driving of the focus driving unit according to determination of executing or omitting the one-way-driving-control based on the shooting-mode selected. In particular, the autofocus control unit is configured to determine executing or omitting the one-way-driving-control based on the shooting-mode selected, and the unit controls the focus-driving unit based on the determination.

In this manner, the image capture device of the further embodiment of the present invention can switch processing or omitting the backlash-removing operation more adequately according to the shooting-mode selected. Therefore, when the sports mode is selected as the shooting-mode for instance, the image capture device can shorten the necessary time for completion of the focusing operation and the user can capture images according to the shooting-mode for improving image quality by omitting the backlash-removing operation to shorten the necessary time for completion of the focusing movement. In other words, the autofocus control unit omits the one-way-driving-control in accordance with the shooting-mode selected if it indicates a high-speed shutter-release response. Otherwise, when the portrait mode is selected as the shooting-mode, the image capture device can improve the focusing precision and the user can capture images according to the shooting-condition by processing the backlash-removing operation because the selection provides focusing precision.

The image capture device of a further embodiment of present invention comprises the focusing unit, the focus driving unit, a temperature-detecting unit and the autofocus control unit. The temperature-detecting unit is configured to detect internal temperature of the image capture device. The temperature detecting unit detects an internal temperature of the image capture device; in still further embodiments the temperature-detecting unit is formed on an external-metering AF module for range-finding or is formed at a periphery of the external-metering AF module when executing the external-metering AF operation. The autofocus control unit is configured for controlling driving of the focus driving unit according to determination of executing or omitting the one-way-driving-control based on the internal temperature detected. In particular, the autofocus control unit is configured to determine executing or omitting the one-way-driving-control based on the internal temperature detected, and the unit controls the focus-driving unit based on the determination. In addition, the autofocus control unit omits the one-way-driving-control, when the internal temperature is within predetermined temperature range including normal temperature.

In this manner, the image capture device can switch processing or omitting the backlash-removing operation according to the internal temperature detected. Therefore, when the internal temperature determined is within the normal temperature range with little effect against the performance of the external-metering AF and the range-finding operation, the image capture device can maintain focusing precision at least partly even if the backlash-removing operation is not processed; can shorten the necessary time for completion of the focusing operation; and the user can capture images according to the shooting-condition by omitting the backlash-removing operation so that shortening the necessary time for completion of the focusing movement is achieved rather than improvement of focusing precision. Otherwise, when the internal temperature detected is outside of the normal temperature range with great effect against the performance of the external-metering AF and the range-finding operation, the image capture device can improve the focusing precision and the user can capture images according to the shooting-condition by processing the backlash-removing operation.

The image capture device of a further embodiment of present invention comprises the focusing unit, the focus driving unit, a shooting-operation input unit, an input-pattern detecting unit and the autofocus control unit. The shooting-operation input unit, such as a shooting-operation input unit, a shutter release switch or a shutter release button, is configured for receiving a command for shooting operation. The input-pattern detecting unit, such as an input-pattern detecting unit, is configured for detecting input-pattern of the shooting operation such as a shutter-release-operation pattern based on the command received. It is acceptable that the shooting-operation input unit may be comprised from one or more parts. The shooting-operation input unit should have an operation stroke at least partly when the shooting-operation input unit is comprised from one part so that the input-pattern detecting unit can detect the plurality of input-patterns distinctively according to elapsed time or operation time of the switching operation between two types of the operation stroke. Otherwise, the input-pattern detecting unit can detect the plurality of input-patterns distinctively according to combination of input into the two parts, when the shooting-operation input unit is comprised from two or more parts. The autofocus control unit is configured for controlling driving of the focus driving unit according to a determination to execute or omit the one-way-driving-control. In particular, the autofocus control unit is configured to determine execution or omission of the one-way-driving-control based on the input-pattern detected, and the autofocus control unit controls the focus-driving unit accordingly.

In this manner, the image capture device of the present invention can switch between processing or omitting the backlash-removing operation according to the input-pattern detected. Therefore, when the input-pattern corresponding to the high-speed shutter-releasing operation is detected, the image capture device can shorten the necessary time for completion of the focusing operation. The focusing operation is shortened by omitting the backlash-removing operation to shorten the necessary time for completion of the focusing movement. Otherwise, when the shutter-release-operation pattern does not correspond to the high-speed shutter-releasing operation, the image capture device can improve the focusing precision by processing the backlash-removing operation so that an improvement of focusing precision is provided.

In addition, the shooting-operation input unit has an initial position, a first position operated from the initial position by first operation and a second position operated further from the first position by second operation. The input-pattern includes a first pattern and a second pattern, the first pattern is defined as that elapsed time from the first operation up to the second operation less than a predetermined time, and the second pattern is defined as that the elapsed time equal to or more than the predetermined time. The autofocus control unit omits the one-way-driving-control, when the input-pattern is the first pattern. In particular, the shooting-operation input unit has an initial position not pressed, a half-press position pressed from the initial position and a full-press position pressed more from the half-press position. The input-pattern detecting unit includes a half-press detecting unit, a full-press detecting unit, an elapsed time detecting unit and a release pattern detecting unit. The half-press detecting unit detects a half-press operation that the shooting-operation input unit is pressed into the half-press position. The full-press detecting unit detects a full-press operation that the shooting-operation input unit is pressed into the full-press position. The elapsed time detecting unit detects elapsed time from the half-press operation up to the full-press operation. The release pattern detecting unit detects the input-pattern according to the elapsed time detected. The autofocus control unit omits the one-way-driving-control, when the input-pattern is based on that the elapsed time thereof is less than a predetermined time.

In this manner, the image capture device can shorten the necessary time for completion of the focusing operation by omitting the backlash-removing operation to shorten the necessary time for completion of the focusing movement when the elapsed time from the first operation up to the second operation is less than predetermined time.

The image capture device of a further embodiment of present invention comprises the focusing unit, the focus driving unit, the shooting-operation input unit, the input-pattern detecting unit and the autofocus control unit. The autofocus control unit is configured for controlling driving of the focus driving unit according to a determination to execute or omit the one-way-driving-control determining based on autofocus operation selected alternatively from a plurality of autofocus operations having different focusing movements, according to the input-pattern detected. In particular, the autofocus control unit is configured to determine whether or not to execute or omit the one-way-driving-control based on autofocus operation selected from a plurality of autofocus operations each having a different focusing movement relative to the other according to the input-pattern detected, and the autofocus control unit controls the focus-driving unit based on the determination. The plurality of autofocus operations having different focusing movements include the external-metering AF operation, the CCD-AF operation and combination of the external-metering AF operation and the CCD-AF, for instance.

In this manner, the image capture device of the present invention can switch between processing or omitting the backlash-removing operation according to the autofocus operation selected according to the input-pattern detected. Therefore, when the input-pattern detected for corresponding to the high-speed shutter-releasing operation, the image capture device can shorten the necessary time for completion of the focusing operation by selecting the external-metering AF operation corresponding to the input-pattern automatically and omit the backlash-removing operation. Otherwise, when the input-pattern does correspond to the high-speed shutter-releasing operation, the image capture device can improve the focusing precision by selecting the CCD-AF operation corresponding to the input-pattern automatically and process the backlash-removing operation to improve focusing precision.

In addition, the shooting-operation input unit has the initial position, the first position and the second position; the input-pattern includes the first pattern and the second pattern; the autofocus control unit selects an autofocus operation with the shortest focus operation among the plurality of autofocus operations, and omits the one-way-driving-control, when the input-pattern is the first pattern. In particular, the shooting-operation input unit has the initial position, the half-press position and the full-press position. The input-pattern detecting unit includes the half-press detecting unit, the full-press detecting unit, the elapsed time detecting unit and the release pattern detecting unit. The autofocus control unit selects the autofocus operation with the shortest focus operation among the plurality of autofocus operations, and omits the one-way-driving-control, when the input-pattern is based on that the elapsed time thereof is less than predetermined time.

In this manner, the image capture device can shorten the necessary time for completion of the focusing operation and the user can capture images according to the shooting-condition by omitting the backlash-removing operation when the elapsed time from the first operation up to the second operation is less than predetermined time.

The image capture device of a further embodiment of present invention comprises the focusing unit, the focus driving unit, the shooting-mode selecting unit, the temperature-detecting unit, the shooting-operation input unit, the input-pattern detecting unit and the autofocus control unit. The autofocus control unit is configured for controlling driving of the focus driving unit according to determination of executing or omitting the one-way-driving-control determining based on combination of the shooting-mode, the internal temperature and the input-pattern. In particular, the autofocus control unit is configured to determine whether or not to execute or omit the one-way-driving-control based on a combination of the shooting-mode, the internal temperature and the input-pattern, the autofocus control unit controls the focus-driving unit based on the determination.

In this manner, the image capture device of the present invention can switch between processing or omitting the backlash-removing operation according to the autofocus operation selected, according to the combination of the shooting-mode, the internal temperature and the input-pattern.

In addition, the shooting-operation input unit has the initial position, the first position and the second position and the input-pattern includes the first pattern and the second pattern. The autofocus control unit omits the one-way-driving-control, when the input-pattern is the first pattern, the shooting-mode indicates high-speed shutter-releasing response in comparison with the other of the plurality of shooting-modes, the internal temperature is within predetermined temperature range including normal temperature, and the input-pattern is the first pattern. In particular, the shooting-operation input unit has the initial position, the half-press position and the full-press position. The input-pattern detecting unit includes the half-press detecting unit, the full-press detecting unit, the elapsed time detecting unit and the release pattern detecting unit. The autofocus control unit omits the one-way-driving-control, when the shooting-mode indicates a high-speed shutter-releasing response in comparison with the other of the plurality of shooting-modes; the internal temperature is within predetermined temperature range including normal temperature; and the input-pattern is based on that the elapsed time thereof less than a predetermined time.

In this manner, the image capture device can shorten the necessary time for completion of the focusing operation and the user can capture images according to the shooting-condition by omitting the backlash-removing operation when the above-mentioned conditions are met.

The image capture device of a further embodiment of present invention comprises the focusing unit, the focus driving unit, the shooting-mode selecting unit, the temperature-detecting unit, the shooting-operation input unit, the input-pattern detecting unit and the autofocus control unit. The autofocus control unit is configured for controlling driving of the focus driving unit according to determination of whether to execute or omit the one-way-driving-control based on a combination of the shooting-mode, the internal temperature and the input-pattern, determining according to autofocus operation selected alternatively from a plurality of autofocus operations having different focusing movements to each other based on the input-pattern detected. In particular, the autofocus control unit is configured to determine execution or omission of the one-way-driving-control based on a combination of the shooting-mode, the internal temperature and the input-pattern. Then, the autofocus control unit controls the focus-driving unit based on the determination, according to autofocus operation selected alternatively from a plurality of autofocus operation having different types of focusing movements relative to each other based on the input-pattern detected.

In this manner, the image capture device of the present invention can switch between processing or omitting the backlash-removing operation according to the autofocus operation selected according to the combination of the shooting-mode, the internal temperature and the autofocus operation selected.

In addition, the shooting-operation input unit has the initial position, the first position and the second position; the input-pattern includes the first pattern and the second pattern. The autofocus control unit omits the one-way-driving-control, when the input-pattern is the first pattern, the autofocus operation is selects the focus operation with the shortest processing among the plurality of autofocus operations; the internal temperature is within predetermined temperature range including normal temperature. In particular, the shooting-operation input unit has the initial position, the half-press position and the full-press position. The input-pattern detecting unit includes the half-press detecting unit, the full-press detecting unit, the elapsed time detecting unit and the release pattern detecting unit. The autofocus control unit omits the one-way-driving-control, when the input-pattern is based on an elapsed time less than predetermined time; the autofocus operation is the focus operation having the shortest among the plurality of autofocus operation process times; and the internal temperature is within predetermined temperature range including normal temperature.

In this manner, the image capture device can shorten the necessary time for completion of the focusing operation and the user can capture images according to the shooting-condition by omitting the backlash-removing operation when above-mentioned conditions are met.

The autofocus control unit of the above-mentioned embodiment adjusts the driving-target position based on a predetermined adjustment value before driving-disactivation of the focus driving unit, when the driving direction of the focus driving unit is opposes the predetermined direction, at a peripheral range before driving-disactivation of the focus driving unit in case of omitting the one-way-driving-control.

In this manner, the image capture device can control an accidental error in a stopping-position of the focusing unit caused by the backlash, by adjusting the driving-target position with predetermined travel distance as the adjustment value.

It is to be understood that both the foregoing general description of the invention and the following detailed description are exemplary, but are not restrictive, of the invention.

BRIEF DESCRIPTION OF THE SEVERAL VIEWS OF THE DRAWINGS

The invention is best understood from the following detailed description when read in conjunction with the accompanying drawings.

FIG. 3(*b*) is a graph showing the backlash effect across focusing positions;

FIG. 3(*c*) is a graph showing the backlash effect across focusing positions;

FIG. 4(*b*) is a graph showing the result of the compensation operation of FIG. 4(*a*) focusing posting operation;

FIG. 8A is a table showing draft mode settings;

FIG. 8B is a table showing normal mode settings;

FIG. 9A is a table showing draft mode settings based on a shooting mode;

FIG. 9B is a table showing normal mode settings based on a shooting mode;

FIG. 10A is a table showing draft mode settings based on an internal temperature;

FIG. 10B is a table showing normal mode settings based on an internal temperature;

FIG. 11A is a table showing draft mode settings based on a shutter release operation; and, FIG. 11B is a table showing normal mode settings based on a shutter release operation.

DETAILED DESCRIPTION OF THE INVENTION

Figure 1:
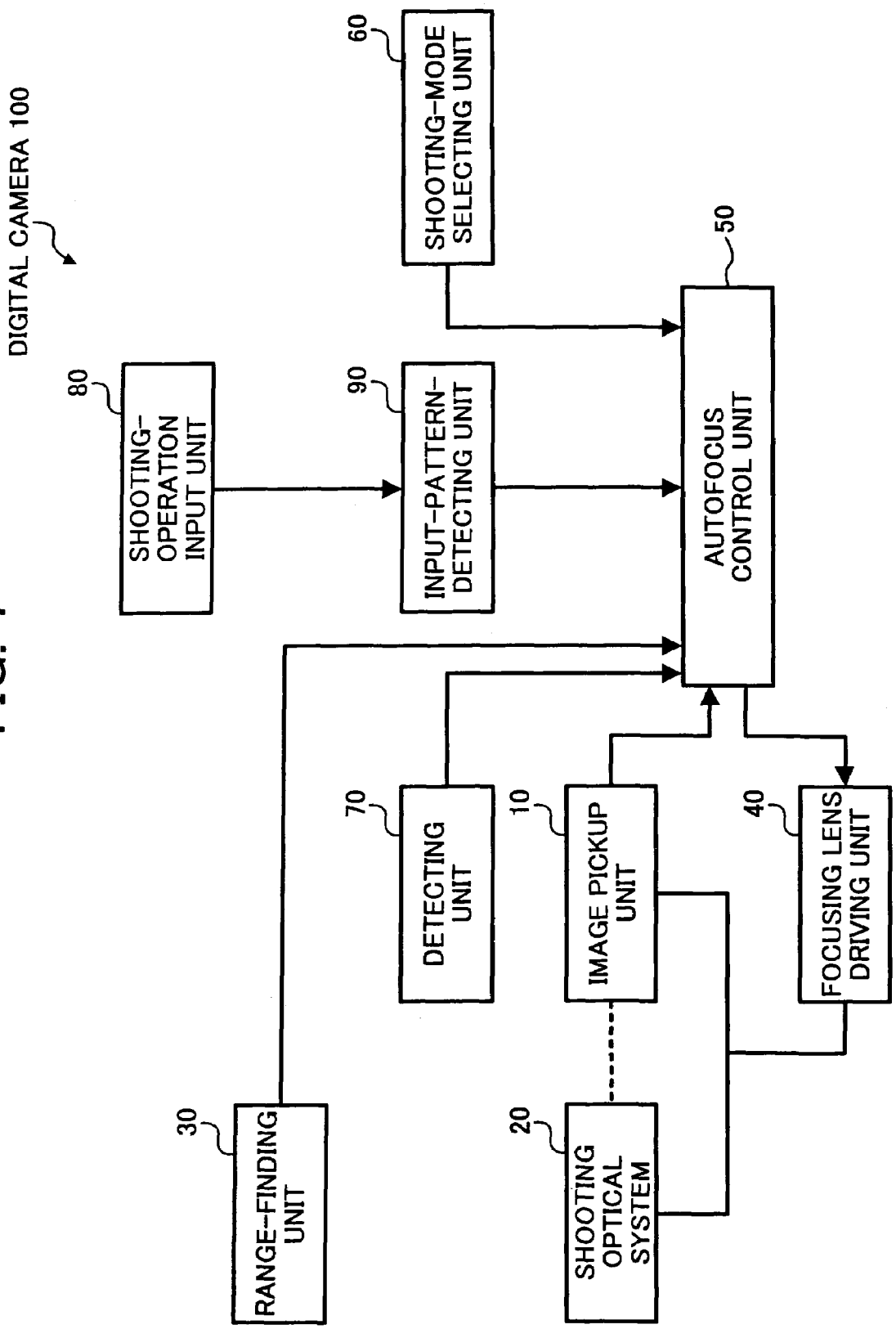
FIG. 1 is a high level block diagram of an exemplary embodiment of the image capture device of the present invention.

Embodiments of the present invention are now described below with reference to the drawings wherein like reference numbers designate like elements throughout. FIG. 1 shows the configuration of an image capture device according to an exemplary embodiment of the present invention.

More specifically, FIG. 1 shows a high level block diagram of a digital camera generally designated 100 of the exemplary embodiment of the invention. The digital camera 100 includes an image pickup unit 10, a shooting optical system 20, a range-finding unit 30, a focusing lens driving unit 40, autofocus control unit 50, a shooting-mode selecting unit 60, a detecting unit 70, a shooting-operation input unit 80 and an input-pattern-detecting unit 90.

The image pickup unit 10 is configured to output an image signal by converting a projected image of an object to an electrical signal. The shooting optical system 20 is configured to project the image of the object onto the image pickup unit 10. The range-finding unit 30 is configured to measure a distance between the subject or scene and the device 100. The focusing lens driving unit 40 is configured to vary a focus condition of the projected image on the image pickup unit 10 by moving the shooting optical system 20 toward an optical axis direction thereof. Of course, those skilled in the art will recognize that "movement" as utilized herein refers to a focusing functionality which does not necessarily require a movement which is detectable external to the device 100.

The shooting-mode selecting unit 60 is configured to input a command for selecting one of a plurality of shooting-modes. The temperature-detecting unit 70 is configured to detect internal temperature of the digital camera 100. The shooting-operation input unit 80 is configured to receive an input command for initiating a shooting operation. The input-pattern-detecting unit 90 is configured to detect an input-pattern of the shooting operation inputted from the input unit 80.

The autofocus control unit 50 is configured to determine one of autofocus operations having two different types of focusing movements corresponding to an input-pattern that is detected by the input-pattern-detecting unit 90. Additionally, the autofocus controller 50 controls the focusing lens driving system so that the projected image of an object is focused onto the image pickup unit 10. Likewise, the autofocus controller 50 controls driving direction in a predetermined range before stopping driving in accordance with selected one of the AF operation corresponding to the input-pattern that is detected by the input-pattern-detecting unit 90.

The AF operation selected by the autofocus control unit 50 includes two operations, a CCD-AF operation and an external-metering AF operation. The CCD-AF is configured to evaluate the focus condition of the projected image on the image pickup unit 10 by moving a focusing lens group 23 and determine the focus condition based on above-mentioned evaluation. The external-metering AF operation is configured to control the focusing lens group 23 (FIG. 2) to move to predetermined focusing position based on the distance between the subject and the device 100 that is detected by the range-finding unit 30.

In addition, the above-mentioned CCD-AF operation is not typical classical CCD-AF operation (i.e., a full-range CCD-AF operation); CCD-AF, as used herein, refers to a hybrid AF operation. The autofocus control unit 50 controls driving of the focusing lens group 23 based on typical classical CCD-AF operation at only a peripheral range of the predetermined focusing position according to the distance that is detected by the range-finding unit 30. When the range-finding unit 30 fails to detect the distance up to the subject, the autofocus control unit 50 controls driving of the focusing lens group 23 across the movable range of the focusing lens group 23 based on typical classical CCD-AF operation.

Also, the AF control operation includes other operations such as a backlash-removing operation that is configured to control the driving of the focusing lens driving unit 40 at the peripheral range of the predetermined focusing position before driving-disactivation, in accordance with a combination of the shooting-mode received from the shooting-mode selecting unit 60, the internal temperature detected by the temperature-detecting unit 70 and the AF operation selected. The backlash-removing operation may be omitted according to imaging circumstances. The backlash-removing operation is described below in detail.

Figure 2:
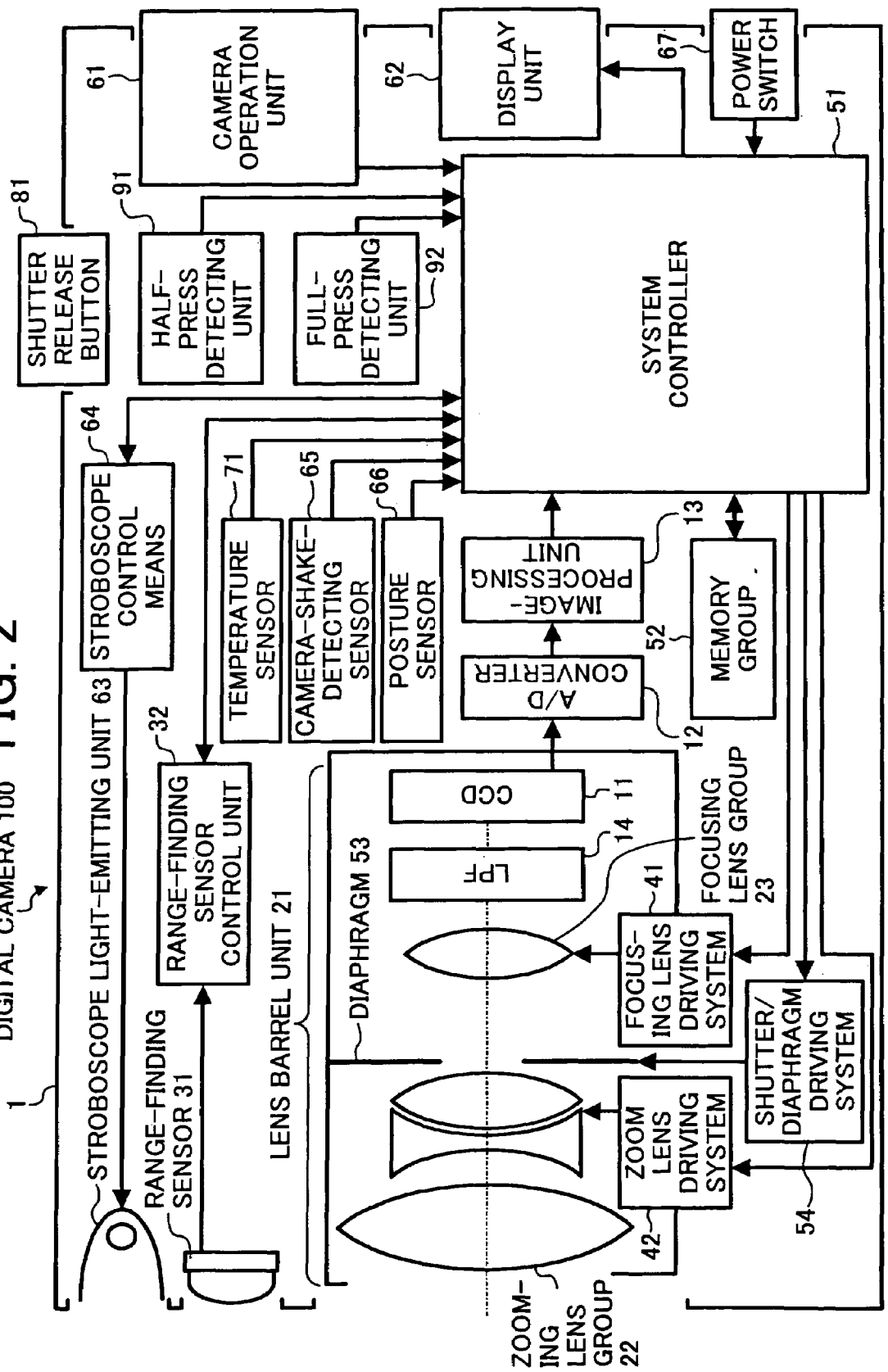
FIG. 2 is a more detailed block diagram of the image capture device shown in FIG. 1.

FIG. 2 is a more detailed block diagram of the digital camera 100. The image pickup unit 10 is shown as a CCD 11, an analog-to-digital A/D converter 12 and an image-processing unit 13. The shooting optical system 20 of the exemplary embodiment is shown as a lens barrel unit 21, a zooming lens group 22 and a focusing lens group 23. The range-finding unit 30 of the exemplary embodiment is shown as a range-finding sensor 31 and a range-finding sensor control unit 32. The focusing lens driving unit 40 of the exemplary embodiment is shown a focusing lens driving system 41. The autofocus control unit 50 of the exemplary embodiment is shown as a system controller 51 and a memory group 52. The shooting-mode selecting unit 60 of the exemplary embodiment is shown as a camera operation unit 61. The temperature-detecting unit 70 of the exemplary embodiment is shown as a temperature sensor 71. The shooting-operation input unit 80 of the exemplary embodiment is shown as a shutter release button 81. The input-pattern-detecting unit 90 of the exemplary embodiment is shown as a half-press detecting unit 91, a full-press detecting unit 92 and a part of system controller 51. Those skilled in the art will recognize that any one of the above-identified units may be combined in a single integrated circuit package with one or more units. Likewise, the functionality of such units may be embodied via an array of discrete logic gates or executable computer code.

The full-press detecting unit 92 is arranged at a full-press position such that the shutter release button 81 is pressed with all strokes among movable strokes thereof, and the half-press detecting unit 91 is arranged at a half-press position that is part way between an initial position that is not pressed and the full-press position.

An elapsed time detecting unit is provided functionally by the instruction set of the system controller 51 to detect an elapsed time, that is measured from a half-press operation (i.e., the shutter release button 81 is pressed into the half-press position), detected by the half-press detecting unit 91, to a full-press operation (i.e., the shutter release button 81 is pressed into the full-press position), detected by the full-press detecting unit 92. After detecting, the system controller 51 functions as a release pattern-detecting unit determining whether the operation is one-stroke-press or two-strokes-press. Then, when the elapsed time detected as a shutter-release-operation pattern is shorter than the predetermined elapsed time, the system controller 51 selects the external-metering AF operation having the shortest time for focusing among the two AF operations. Otherwise, when the elapsed time detected is longer than the predetermined elapsed time, the system controller 51 selects CCD-AF operation (i.e., includes the hybrid AF operation and full-range CCD-AF operation) having the highest focusing precision among the two AF operations.

In addition, the one-stroke-press corresponds to an operation that the shutter release button 81 is pressed from the initial position into the full-press position, with one-stroke operation successively. In this case, the elapsed time that the shutter release button 81 is pressed from the half-press position into the full-press position is extremely short. The two-strokes-press corresponds to an operation that the shutter release button 81 is pressed from the initial position into the full-press position, with two-stroke operation, step-by-step. The shutter release button 81 is pressed from the initial position into the half-press position; a press-operation is stopped for an interval of time; and the shutter release button 81 is pressed again from the half-press position into the full-press position. In this case, the elapsed time that the shutter release button 81 is pressed from the half-press position into the full-press position is comparatively long.

Also, a display unit 62, a "flash" or stroboscope light-emitting unit 63, a stroboscope control unit 64, a zoom lens driving system 42, a diaphragm 53, a shutter/diaphragm driving system 54, a, stroboscope control unit 64, a camera-shake-detecting sensor 65, a posture sensor 66 and a power switch 67 are arranged internal to the housing 1 of the digital camera 100.

The display unit 62 is configured to display a visible image corresponding to a digital signal that is inputted to the system controller 51 via the CCD 11, and various menu information established at the camera operation unit 61. The stroboscope light-emitting unit 63 is configured to emit light for shooting. The stroboscope control unit 64 is configured to control the light emission of the stroboscope light-emitting unit 63. The zoom lens driving system 42 is configured to drive the zooming lens group 22. The shutter/diaphragm driving system 54 is configured to drive the diaphragm 53 arranged between the zooming lens group 22 and focusing lens group 23 in order to adjust an opening of the diaphragm 53. The camera-shake-detecting sensor 65 is configured to detect camera-shake of the digital camera 100. The posture sensor 66 is configured to detect posture of the digital camera 100. The focusing lens driving system 41 is configured to drive the focusing lens group 23 along the optical axis direction. The zoom lens driving system 42 is configured to drive the zooming lens group 22 along the optical axis direction.

Camera-shake condition and posture information of the digital camera detected by the camera-shake-detecting sensor 65 and the posture sensor 66 respectively are employed by compensation processing of the instruction set of the system controller 51.

The A/D converter 12 is configured to convert an analog signal from the CCD 11 into a digital signal. The image-processing unit 13 is configured to process signal conditioning to digital signal and output the processed digital signal into the system controller 51.

The stroboscope light-emitting unit 63 is operably linked to the system controller 51 via the stroboscope control unit 64. The half-press detecting unit 91 and the full-press detecting unit 92 are operably linked to the system controller 51.

The memory group 52 connected to the system controller 51 is configured to store parameters that are employed for controlling various operations by the system controller 51 in accordance with shooting-condition, and to store information transmitted from the system controller 51 temporarily. The memory group 52 may include, for example, an external storage media, such as Smart Media or Compact Flash, that is connected to the digital camera 100 detachably and is configured to store a digital signal corresponding to the optical image of the subject that is captured.

The range-finding sensor 31 may be a passive AF sensor that detects a distance between the subject and the image apparatus based on a phase difference of the optical image of the subject, alternatively, an active AF sensor may be utilized for detecting a distance between the subject and the image apparatus based on a time that is necessary for a reflected ultrasonic wave or near infrared rays wave to return to the apparatus after transmission therefrom.

A driving distance of the focusing lens group 23 is established in accordance with a pulse-number oscillated with a predetermined frequency. In this way, the driving distance becomes large as pulse-number becomes large. A stopping-position of the focusing lens group 23 may have an accidental error in accordance with a driving direction (a push-out direction or a pull-back direction). The error is gauged from a current position of the focusing lens group 23 toward the focusing position as a driving-target position due to hysteresis with backlash. Thus, backlash results, based on components inside of the focusing lens driving system 41 and based upon a coupling part between the focusing lens group 23 and the focusing lens driving system 41, even if predetermined pulse-number is applied into a pulse motor of the focusing lens driving system 41. Of course, alternative methods of incrementally driving a motor will be known to those skilled in the art, and, as such, equally applicable to the pulse example described herein.

Figure 3A:
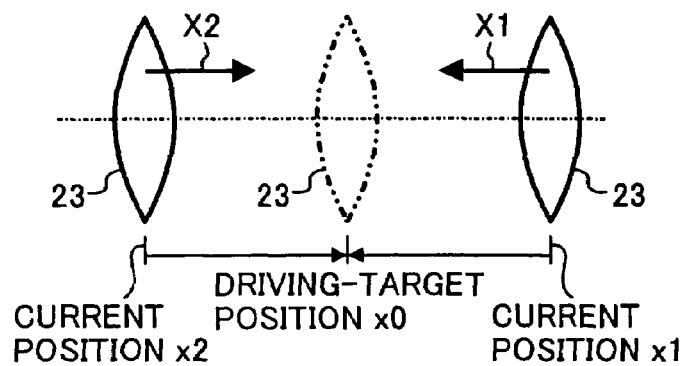
FIG. 3(*a*) is a diagram of lens position showing the effect of backlash on focusing precision.
Figure 3B:
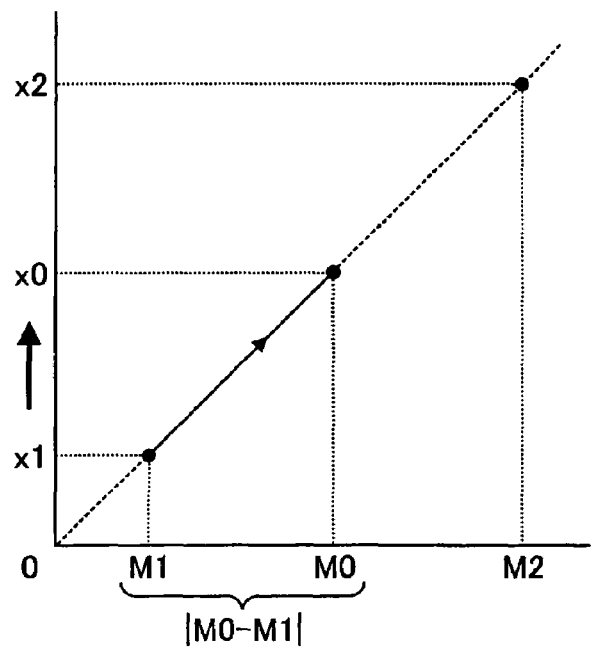
Figure 3C:
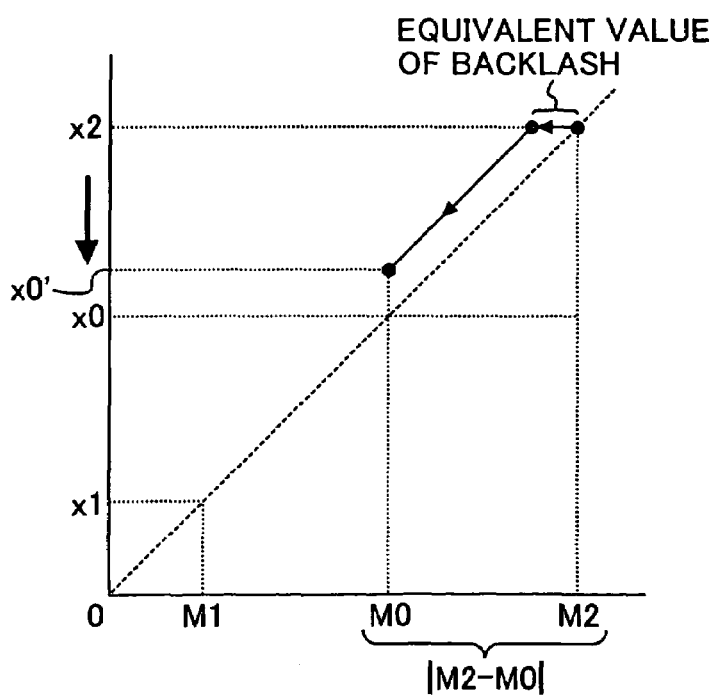

In other words, when a driving-target position x0 is in the push-out direction X1 (i.e., away from the current position x1 of the focusing lens group 23), as shown in FIG. 3(a); the focusing lens group 23 can be stopped at the driving-target position x0, by applying the pulse-number |M0-M1| to the pulse motor of the focusing lens driving system 41 corresponding to a distance between the current position x1 and the driving-target position x0, as shown in FIG. 3(b). Otherwise, when a driving-target position x0 is in the pull-back direction X2 (i.e., away from the current position x2 of the focusing lens group 23), as shown in FIG. 3(a), the focusing lens group 23 will be stopped at a position that is before the driving-target position x0 so that the focusing lens group 23 is located within a range of the backlash. Even if applying the pulse-number |M2-M0| to the pulse motor of the focusing lens driving system 41 corresponding to a distance between the current position x2 and the driving-target position x0, as shown in FIG. 3(c). As a result, the focusing lens group 23 goes a bit out of focus due to the accidental error distance |x0'-x0|.

So, the backlash is substantially removed by controlling a driving direction among predetermined range before the driving-disactivation of the focusing lens driving system 41 to be the push-out direction X1, by controlling driving of the focusing lens driving system 41 by the system controller 51 as the autofocus control unit 50.

Figure 4A:
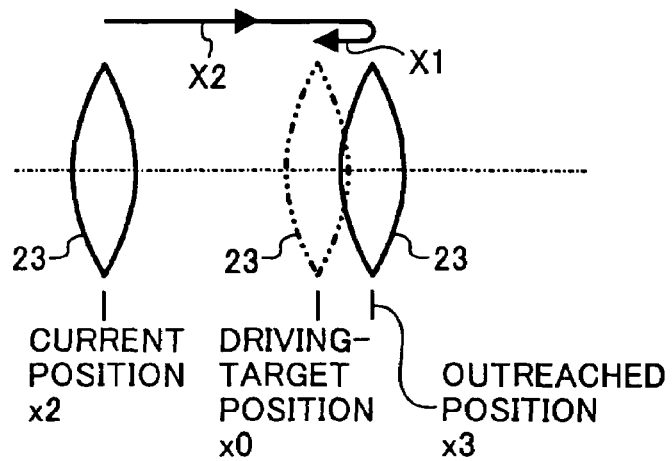
FIG. 4(*a*) is a diagram of lens positions showing a backlash compensation operation.
Figure 4B:
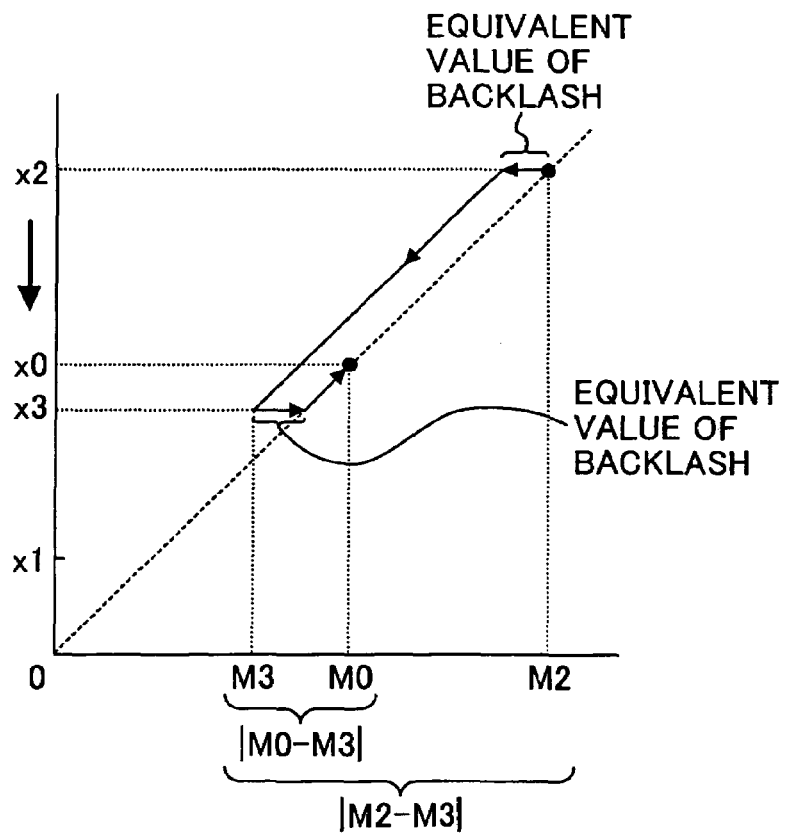

Referring now generally to FIG. 4, when a driving-target position x0 in the pull-back direction X2 (i.e., away from the current position x2 of the focusing lens group 23), as shown in FIG. 4(a), pulse-number |M2-M3| is applied to the pulse motor of the focusing lens driving system 41 in order to drive the focusing lens group 23 in the pull-back direction to a position x3 beyond the driving-target position x0, as shown in FIG. 4(b). After reaching to the position x3, the focusing lens group 23 adjusted in the push-out direction X1 relative to the driving-target position x0. The target position x0 is reached by applying pulse-number |M0-M3|, the pulse motor of the focusing lens driving system 41, corresponding to the distance between the driving-target position x0 and the position x3 (range of the backlash). In this manner, the digital camera of the present application can prevent going a bit out of focus by executing the above-mentioned backlash-removing operation.

In the exemplary embodiment, selection of executing or omitting the above-mentioned backlash-removing operation by the AF control unit 50, is determined by the system controller 51 in accordance with the shooting-mode inputted into the mode-selecting unit 60, the temperature detected by temperature-detecting unit 7 and the AF operation selected. A correspondence of executing or omitting of the above-mentioned backlash-removing operation to each factors, is determined as shown in FIGS. 8A and 8B.

In addition, 'Draft mode' shown as one of the shooting-mode in FIGS. 8A and 8B, corresponds to a so-called 'Sport mode' or 'High speed mode' in which high-speed shutter-releasing response is demanded. 'Normal mode' corresponds to the remaining shooting-modes, such as so-called 'portrait mode', 'distant landscape mode' and the like. The 'Normal temperature range' shown in FIGS. 8A and 8B corresponds to a predetermined range of temperature including normal temperature such as centigrade 20 degrees; normal temperature +−10 degrees, for instance; alternatively normal temperature +−5 degrees; may be used in further embodiments, or normal temperature +−3 degrees. 'Out of Normal temperature range' corresponds to out of range of the above-mentioned 'Normal temperature' ranges.

The operation of the digital camera 100 of the exemplary embodiment is described hereinafter based on the flow chart shown in FIGS. 5, 6 and 7. The shooting-mode is set upon powering the digital camera 100, typically by user operation of the power switch 67, as shooting preparation (#1). Then the shooting optical system 20 is oriented toward a subject to be imaged and the shutter release switch 61 is pressed via the shutter release button 81 for shooting. When zooming in on the subject, the system controller 51 controls driving of the zoom lens driving system 4 in order to drive the zooming lens group 22 by operation of the camera operation unit 61, when necessary.

When the shutter release button 81 is pressed into the half-press position, the half-press detecting unit 91 detects press (S2); the system controller 51 receives start signal as start command for the AF operation. The system controller 51 starts measuring the elapsed time after detection of half-press by starting of the internal timer of the system controller 51 based on receiving the start signal, and a range-finding flag is configured to '0', as initial value (S3).

The range-finding flag is configured to identify whether the range-finding operation has been executed by the range-finding sensor 31 adequately; value '0' means that the range-finding operation has been executed adequately, and value '1' means that the range-finding operation has been not executed adequately (i.e., the range-finding operation has failed). At the same time, the system controller 51 controls the range-finding sensor control unit 32 in order to operate the range-finding sensor 31. Also the system controller 51 controls the stroboscope control 64 in order to emit infrared light from the stroboscope light-emitting unit 63 for the range-finding operation at substantially the same time.

The reflected light corresponding to the emitted infrared light is reflected back toward the range-finding sensor 31 from the subject. The range-finding sensor 31 detects the reflected light; calculates a time that is necessary until the reflected light is detected after emitting the infrared light; calculates the distance between the subject and the imaging apparatus; and information of the distance is transmitted into the system controller 51 (S4). The internal timer of the system controller 51 may calculate the above-mentioned time. On the other hand, the range-finding sensor 31 may not calculate the distance up to the subject according to a shooting-condition. In this case, a range-finding NG signal is transmitted to the system controller 51 (S4).

The system controller 51 detects that whether the range-finding operation has been executed by the range-finding sensor 31 (S5). When the range-finding operation has been executed adequately, a lens position corresponding to detected distance up to the subject is configured as a driving-target position of the focusing lens group 23 (S6); and the system controller 51 starts to control the driving of the focusing lens group 23 to the driving-target position by controlling driving of the focusing lens driving system 41 (S9). On the other hand, when the range-finding operation has not been not executed adequately, the system controller 51 resets the range-finding flag into '1' (S7); a fixed focus position of the shooting optical system 20 is configured as the driving-target position of the focusing lens group 23 (S8); and the system controller 51 staffs to control the driving of the focusing lens group 23 to the driving-target position by controlling driving of the focusing lens driving system 41 (S9). The fixed focus position is defined as a lens position that it seems to be focused to wide range, from distant-view to close-view so that depth of field is relatively deep.

Figure 5:
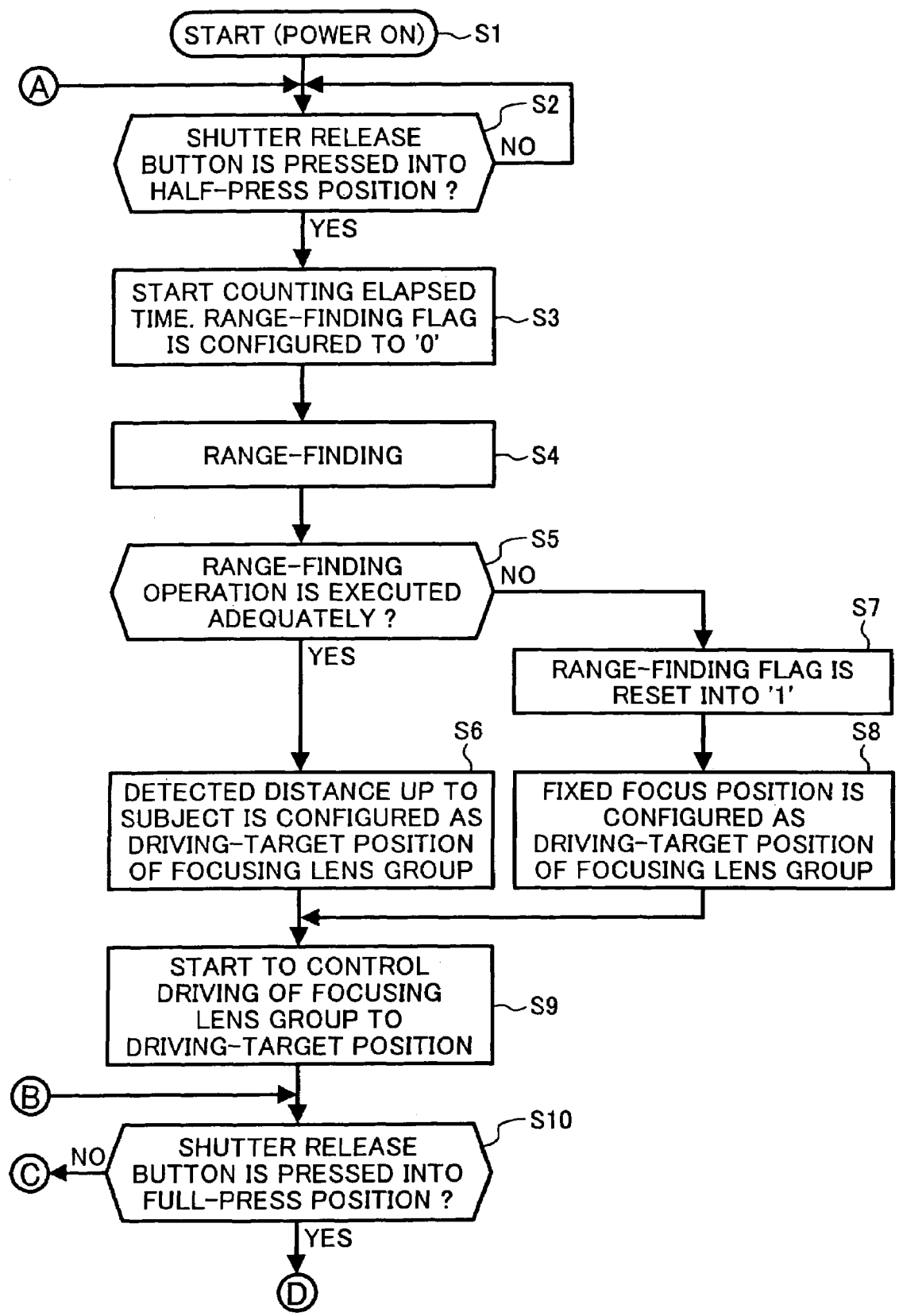
FIG. 5 is a flow chart illustrating an AF operation in the exemplary digital camera shown in FIG. 1.
Figure 6:
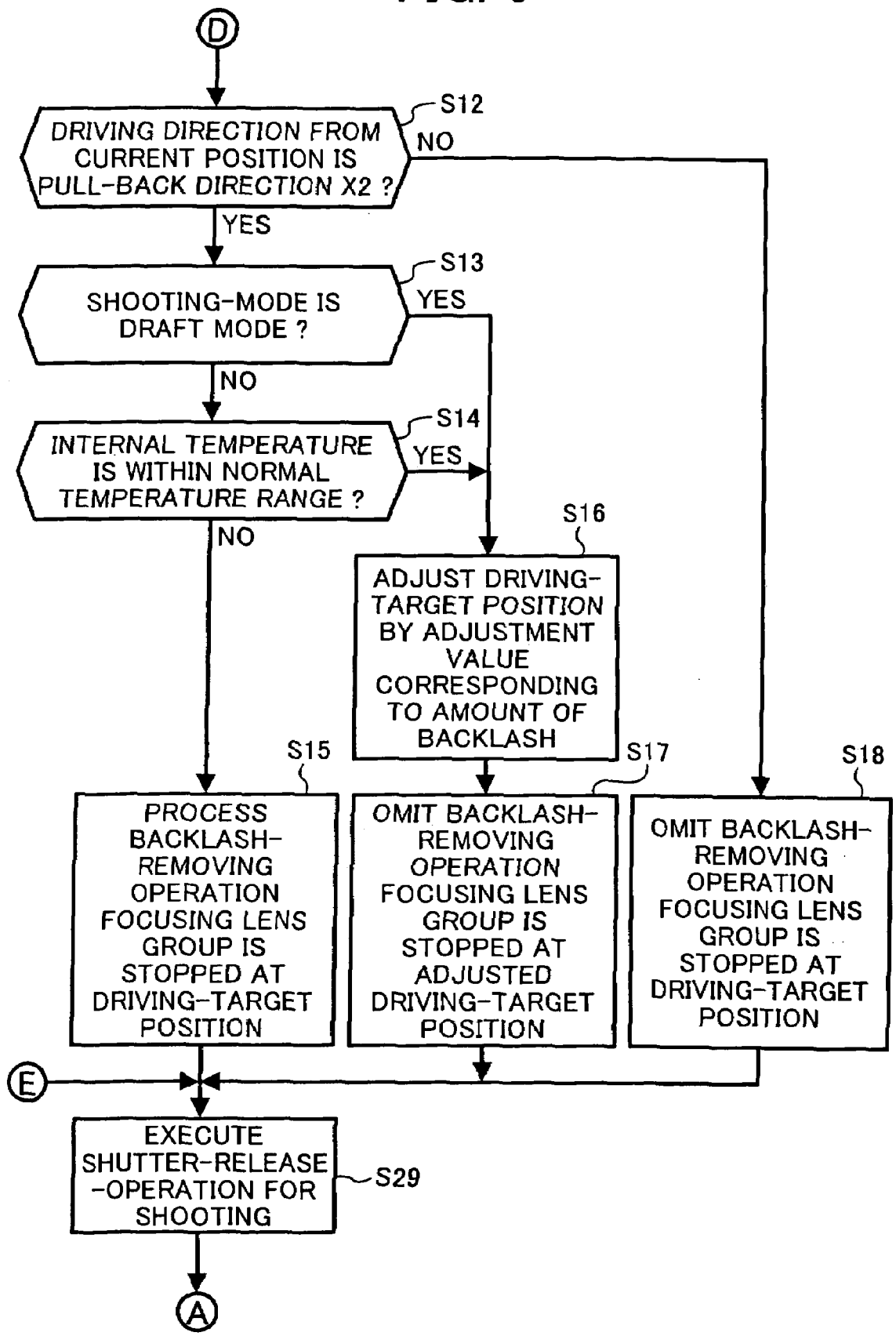
FIG. 6 is a flow chart illustrating an AF operation in the exemplary digital camera shown in FIG. 1.

The above-mentioned procedure shown in FIG. 5 is the operation after the shutter release button 81 is pressed into the half-press position. In the digital camera 100 of the exemplary embodiment of the present invention, when the shutter release button 81 is pressed into the half-press position, the range-finding operation and the driving of the focusing lens group 23 starts at first, regardless of the one-stroke-press or the two-strokes-press. Then the system controller 51 detects whether the shutter release button 81 is pressed into the full-press position (S10).

In particular, when the shutter release button 81 is pressed into the full-press position, the full-press detecting unit 92 detects the full-press operation; transmits detected result into the system controller 51; the system controller 51 determines whether the full-press operation has been ordered based on detected result from the full-press detecting unit 92. The full-press operation is not detected when the determination step (S10) of the first time is executed, regardless of the one-stroke-press or the two-strokes-press so that the operation from the detection of half-press (S2) to the determination step (S10) is done instantaneously. So, the full-press operation is not detected at first time of the determination step (S10); and the next step goes to step 11 (S11).

The system controller 51 determines whether the elapsed time started counting by the timer since the half-press operation is detected at step 2 (S2) is less than predetermined standard time T1 (S11). The standard time T1 is configured adequate value for determining whether press operation to the shutter release button 81 is the one-stroke-press or not. The elapsed time is determined that is less than the standard time T1 at step 11 (S11) of the first time so that the operation from the detection of half-press (S2) to the determination step (S10) is done instantaneously according to mentioning above. So, the next step goes to step 10 (S10), and the operations between above-mentioned step 10 (S10) and step 11 (S11) is processed repeatedly until either the full-press is detected before the standard time T1 passes or the elapsed time becomes more than the standard time T1. Then, when the full-press operation is detected before the standard time T1 passes (from S10 to S12), the system controller 51 determines that the press-operation including the full-press operation is the one-stroke-press. After that, the system controller 51 detects that whether the driving direction from the current position toward the driving-target position of the focusing lens group 23 is the pull-back direction X2 that is affected by the backlash as shown in FIG. 3 (S12).

When the driving direction detected is not the pull-back direction X2 (i.e., the driving direction is detected as the push-out direction X1 without the need for the backlash-removing operation), the system controller 51 controls the focusing lens driving system 41 to drive the focusing lens group 23 (S18) in order to stop at the driving-target position that is configured at step 6 (S6) or step 8 (S8), without the backlash-removing operation; shoots the subject (S29) by controlling driving of the shutter/diaphragm driving system 54 to execute the shutter release operation; and the half-press detecting unit 91 waits the shutter release button 81 is pressed into the half-press position next time (S2). In addition, the AF operation at step 18 (S18) is the same as the external-metering AF operation. Also, the backlash-removing operation at step 18 (S18) is omitted by reasons of that the driving direction of the focusing lens group 23 is a direction that is not affected by the backlash, as shown in FIG. 3(b); the combination such as the shooting-mode shown in FIGS. 8A and 8B is not reason for omitting. Otherwise, when the driving direction detected is the pull-back direction X2 (from S12 to S13), the system controller 51 determines whether the shooting-mode inputted to the camera operation unit 61 is the draft mode (S13) and whether the internal temperature of the digital camera 100 detected by the temperature sensor 71 is within the normal temperature range (S14).

When the shooting-mode is determined as the normal mode and the internal temperature is determined as outside of the normal temperature range, the system controller 51 executes the backlash-removing operation according to 'backlash-removing operation=Execute' shown in FIGS. 8A and 8B, depending on the combination (shown as 'Combination (7)' in FIGS. 8A and 8B) of the shutter-release-operation as the one-stroke-press determined at step 10 (S10) and the AF operation; controls driving of the focusing lens driving system 41 (S15) in order to stop the focusing lens group 23 at the driving-target position that is configured at step 6 (56) or step 8 (S8); makes the diaphragm 53 execute the shutter-release-operation for shooting (S29) by controlling driving of the shutter/diaphragm driving system 54 after driving-disactivation of the focusing lens group 23; and the half-press detecting unit 91 waits the shutter release button 81 is pressed into the half-press position next time (52). In this manner, when it is in the situation having the combination of 'Normal mode', 'Outside of normal temperature range' and 'One-stroke-press', shown as 'Combination (7)' in FIGS. 8A and 8B, the user can capture images according to the shooting-condition by giving priority to controlling the accidental error of the stopping-position according to the internal temperature of the digital camera 100.

Also, when the shooting-mode is determined as the normal mode at step 13 (S13) and the internal temperature is determined as the normal temperature range at step 14 (S14) respectively shown as 'Combination (5)' in FIGS. 8A and 8B, the system controller 51 omits the backlash-removing operation (S17) according to 'backlash-removing operation=Omit' shown in FIGS. 8A and 8B. Instead, the system controller 51 reads-out a travel distance as adjustment value corresponding to the amount of backlash, stored in the memory group previously; adjusts the driving-target position that is configured at step 6 (S6) or step 8 (S8) with the travel distance (S16). The system controller 51 controls the driving of the focusing lens driving system 41 in order to stop the focusing lens group 23 at the adjusted driving-target position (S17); and makes the diaphragm 53 execute the shutter-release-operation for shooting S29 by controlling driving of the shutter/diaphragm driving system 54 after driving-disactivation of the focusing lens group 23; and the half-press detecting unit 91 waits the shutter release button 81 is pressed into the half-press position next time (S2). In this manner, when it is in the condition having the combination of 'Normal mode', 'Normal temperature range' and "One-stroke-press', the user can capture images according to the shooting-condition by omitting the backlash-removing operation for giving priority to focusing speed. Moreover, the digital camera can control the accidental error of the stopping-position that may cause by the backlash by adjusting the driving-target position by predetermined travel distance as the adjustment value.

Also, when the shooting-mode is determined as the draft mode at step 13 (S13) shown as 'Combination (1) or (3)' in FIGS. 8A and 8B regardless of that the internal temperature is the normal temperature range (S14), the system controller 51 omits the backlash-removing operation (S17) according to 'backlash-removing operation=Omit' shown in FIGS. 8A and 8B. Instead, the system controller 51 reads-out a travel distance as adjustment value corresponding to the amount of backlash, stored in the memory group previously; adjusts the driving-target position that is configured at step 6 (S6) or step 8 (S8) with the travel distance (S16); controls the driving of the focusing lens driving system 41 in order to stop the focusing lens group 23 at the adjusted driving-target position (S17); and makes the diaphragm 53 execute the shutter-release-operation for shooting (S29) by controlling driving of the shutter/diaphragm driving system 54 after driving-disactivation of the focusing lens group 23; and the half-press detecting unit 91 awaits the shutter release button 81 being pressed into the half-press position next time (S2). In this manner, when it is in the condition having the combination of 'Draft mode' and "One-stroke-press", the user can capture images according to the shooting-condition by omitting the backlash-removing operation for giving priority to focusing speed. Moreover, the digital camera can control the accidental error of the stopping-position that may cause by the backlash by adjusting the driving-target position by predetermined travel distance as the adjustment value.

Each above-mentioned operations is in the case that the shutter-release-operation pattern is detected as the one-stroke-press (from S10 to S12). If the full-press operation is not detected by the full-press detecting unit 92 during the standard time T1 at step 10 (S10) and step 11 (S11), the system controller 51 determines that the press-operation is not the one-stroke-press (S11 to S12 via S10). In addition, the full-press operation of the shutter release button 81 is not detected at this point yet.

Then, the system controller 51 determines whether the range-finding flag is configured '1' at this point (S17). In other words, the range-finding flag could be configured to '0' when the range-finding operation has been executed adequately by the range-finding sensor 31 at step 5 S5 to S6); and the range-finding flag could be configured to '1', when the range-finding operation has been not executed adequately by the range-finding sensor 31 at step 5 (S5 to S7). If the range-finding flag is '0', that means the hybrid AF operation has failed; if the range-finding flag is '1', that means the hybrid AF operation is impossible to execute. This determination is employed for selecting the AF operation.

Next, the system controller 51 controls driving of the focusing lens driving system 41 in order to execute the full-range CCD-AF operation (S20) when the range-finding flag is '1'; controls the driving of the focusing lens driving system 41 according to 'Combination (2), (4), (6) and (8)' shown in FIGS. 8A and 8B in order to execute the backlash-removing operation when stopping the focusing lens group 23 at a position that is peak of contrast detected by the full-range CCD-AF operation; and the full-press detecting unit 92 waits the shutter release button 81 is pressed into the full-press position from the half-press position (between S27 and S28). When the full-press operation of the shutter release button 81 is detected by the full-press detecting unit 92, the system controller 51 makes the diaphragm 53 execute the shutter-release-operation for shooting (S29) by controlling driving of the shutter/diaphragm driving system 54; and the half-press detecting unit 91 awaits the shutter release button 81 being pressed into the half-press position next time (S2). When the condition of the half-press operation is canceled while the full-press detecting unit 92 waits the shutter release button 81 is pressed into the full-press position from the half-press position (between S27 and S28), the half-press detecting unit 91 awaits the shutter release button 81 being pressed into the half-press position next time (S2). In this manner, when the AF operation selected is the full-range CCD-AF operation, the user can capture images according to the shooting-condition by executing the backlash-removing operation for giving priority to focusing precision.

Otherwise, the system controller 51 controls driving of the focusing lens driving system 41 (S22) in order to execute the hybrid AF operation when the range-finding flag is '0'. In other words, the system controller 51 makes the focusing lens driving system 41 to execute the CCD-AF operation at only the peripheral range of the driving-target position of the focusing lens group 23 that is configured at step 6 (S6). Moreover, the digital camera 100 can shorten the elapsed time of the hybrid AF operation so that driving of the focusing lens group 23 to the driving-target position is started already in this point (S9). Then, the system controller 51 determines whether the shooting-mode inputted into the camera operation unit 61 is the draft mode (S23); and detects whether the internal temperature of the digital camera 100 detected by the temperature sensor 71 is within the normal temperature range (S24).

When the shooting-mode is determined as the normal mode at step 23 (S23) and the internal temperature is determined as outside of the normal temperature range at step 24 (S24)), the system controller 51 controls driving of the focusing lens driving system 41 (S21) according to 'backlash-removing operation=Execute' shown in FIGS. 8A and 8B depending on the combination (shown as 'Combination (8)' in FIGS. 8A and 8B) of the shooting-mode, the internal temperature and the AF operation (i.e., the hybrid AF operation), in order to execute the backlash-removing operation when stopping the focusing lens group 23 at a position that is peak of contrast detected by the full-range CCD-AF operation; and the full-press detecting unit 92 waits the shutter release button 81 is pressed into the full-press position from the half-press position (between S27 and S28). When the full-press operation of the shutter release button 81 is detected by the full-press detecting unit 92, the system controller 51 makes the diaphragm 53 execute the shutter-release-operation for shooting (S29) by controlling driving of the shutter/diaphragm driving system 54; and the half-press detecting unit 91 awaits the shutter release button 81 being pressed into the half-press position next time (S2). When the condition of the half-press operation is canceled while the full-press detecting unit 92 waits the shutter release button 81 is pressed into the full-press position from the half-press position (between S27 and S28), the half-press detecting unit 91 awaits the shutter release button 81 being pressed into the half-press position next time (S2). In this manner, when it is in the condition having the combination of the normal mode, outside of the normal temperature range and the hybrid AF operation, the user can capture images according to the shooting-condition by omitting the backlash-removing operation for giving priority to focusing speed.

Also, when the shooting-mode is determined as the normal mode at step 23 (S23) and the internal temperature is determined as the normal temperature range at step 24 (S24), the system controller 51 controls driving of the focusing lens driving system 41 (S21) according to 'backlash-removing operation=Execute' shown in FIGS. 8A and 8B depending on the combination (shown as 'Combination (6)' in FIGS. 8A and 8B) of the shooting-mode, the internal temperature and the AF operation (i.e., the hybrid AF operation), in order to execute the backlash-removing operation when stopping the focusing lens group 23 at a position that is peak of contrast detected by the full-range CCD-AF operation; and the full-press detecting unit 92 waits the shutter release button 81 being pressed into the full-press position from the half-press position (between S27 and S28). When the full-press operation of the shutter release button 81 is detected by the full-press detecting unit 92, the system controller 51 makes the diaphragm 53 execute the shutter-release-operation for shooting (S29) by controlling driving of the shutter/diaphragm driving system 54; and the half-press detecting unit 91 awaits the shutter release button 81 being pressed into the half-press position next time (S2). When the condition of the half-press operation is canceled while the full-press detecting unit 92 awaits the shutter release button 81 being pressed into the full-press position from the half-press position (between S27 and S28), the half-press detecting unit 91 waits the shutter release button 81 is pressed into the half-press position next time (S2). In this manner, when it is in the condition having the combination of the normal mode, the normal temperature range and the hybrid AF operation, the user can capture images according to the shooting-condition by omitting the backlash-removing operation for giving priority to focusing speed.

Also, when the shooting-mode is determined as the draft at step 23 (S23) and the internal temperature is determined as out of the normal temperature range at step 24 (S24), the system controller 51 controls driving of the focusing lens driving system 41 (S21) according to 'backlash-removing operation=Execute' shown in FIGS. 8A and 8B depending on the combination (shown as 'Combination (4)' in FIGS. 8A and 8B) of the shooting-mode, the internal temperature and the AF operation (i.e., the hybrid AF operation), in order to execute the backlash-removing operation when stopping the focusing lens group 23 at a position that is peak of contrast detected by the full-range CCD-AF operation; and the full-press detecting unit 92 awaits the shutter release button 81 being pressed into the full-press position from the half-press position (between S27 and S28). When the full-press operation of the shutter release button 81 is detected by the full-press detecting unit 92, the system controller 51 makes the diaphragm 53 execute the shutter-release-operation for shooting (S29) by controlling driving of the shutter/diaphragm driving system 54; and the half-press detecting unit 91 awaits the shutter release button 81 being pressed into the half-press position next time (S2). When the condition of the half-press operation is canceled while the full-press detecting unit 92 awaits the shutter release button 81 being pressed into the full-press position from the half-press position (between S27 and S28), the half-press detecting unit 91 waits the shutter release button 81 is pressed into the half-press position next time (S2). In this manner, when it is in the condition having the combination of the normal mode, the normal temperature range and the hybrid AF operation, the user can capture images according to the shooting-condition by executing the backlash-removing operation for giving priority to focusing precision.

Also, when the shooting-mode is determined as the draft mode at step 23 (S23) and the internal temperature is determined as the normal temperature range at step 24 (S24), the system controller 51 controls driving of the focusing lens driving system 41 to omit the backlash-removing operation (S21) according to 'backlash-removing operation=Omit' shown in FIGS. 8A and 8B depending on the combination (shown as 'Combination (2)' in FIGS. 8A and 8B) of the shooting-mode, the internal temperature and the AF operation (i.e., the hybrid AF operation). In this case, the system controller 51 reads-out a travel distance as adjustment value corresponding to the amount of backlash, stored in the memory group previously; adjusts the driving-target position that is configured at step 6 (S6) or step 8 (S8) with the travel distance (S25); controls the driving of the focusing lens driving system 41 in order to stop the focusing lens group 23 at the adjusted driving-target position (S26); and the full-press detecting unit 92 awaits the shutter release button 81 being pressed into the full-press position from the half-press position (between S27 and S28). When the full-press operation of the shutter release button 81 is detected by the full-press detecting unit 92, the system controller 51 makes the diaphragm 53 execute the shutter-release-operation for shooting (S29) by controlling driving of the shutter/diaphragm driving system 54; and the half-press detecting unit 91 awaits the shutter release button 81 being pressed into the half-press position next time (S2). When the condition of the half-press operation is canceled while the full-press detecting unit 92 waits the shutter release button 81 is pressed into the full-press position from the half-press position (between S27 and S28), the half-press detecting unit 91 waits the shutter release button 81 is pressed into the half-press position next time (S2). In this manner, when it is in the condition having the combination of the draft mode, the normal temperature range and the hybrid AF operation, the user can capture images according to the shooting-condition by omitting the backlash-removing operation for giving priority to focusing speed. Moreover, the digital camera can control the accidental error of the stopping-position that may cause by the backlash by adjusting the driving-target position by predetermined travel distance as the adjustment value.

Figure 7A:
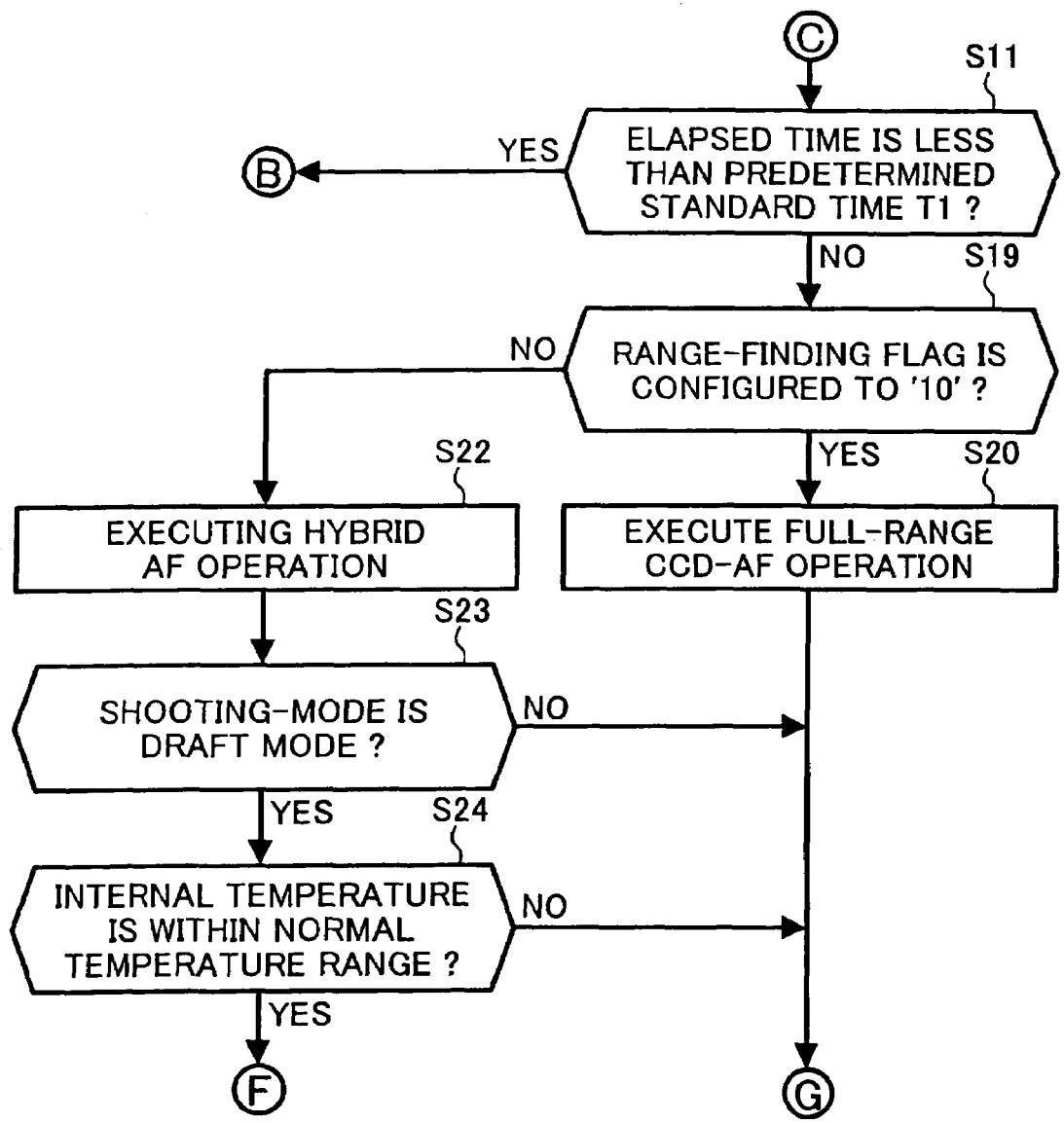
FIG. 7 is a flow chart illustrating an AF operation in the exemplary digital camera shown in FIG. 1.
Figure 7B:
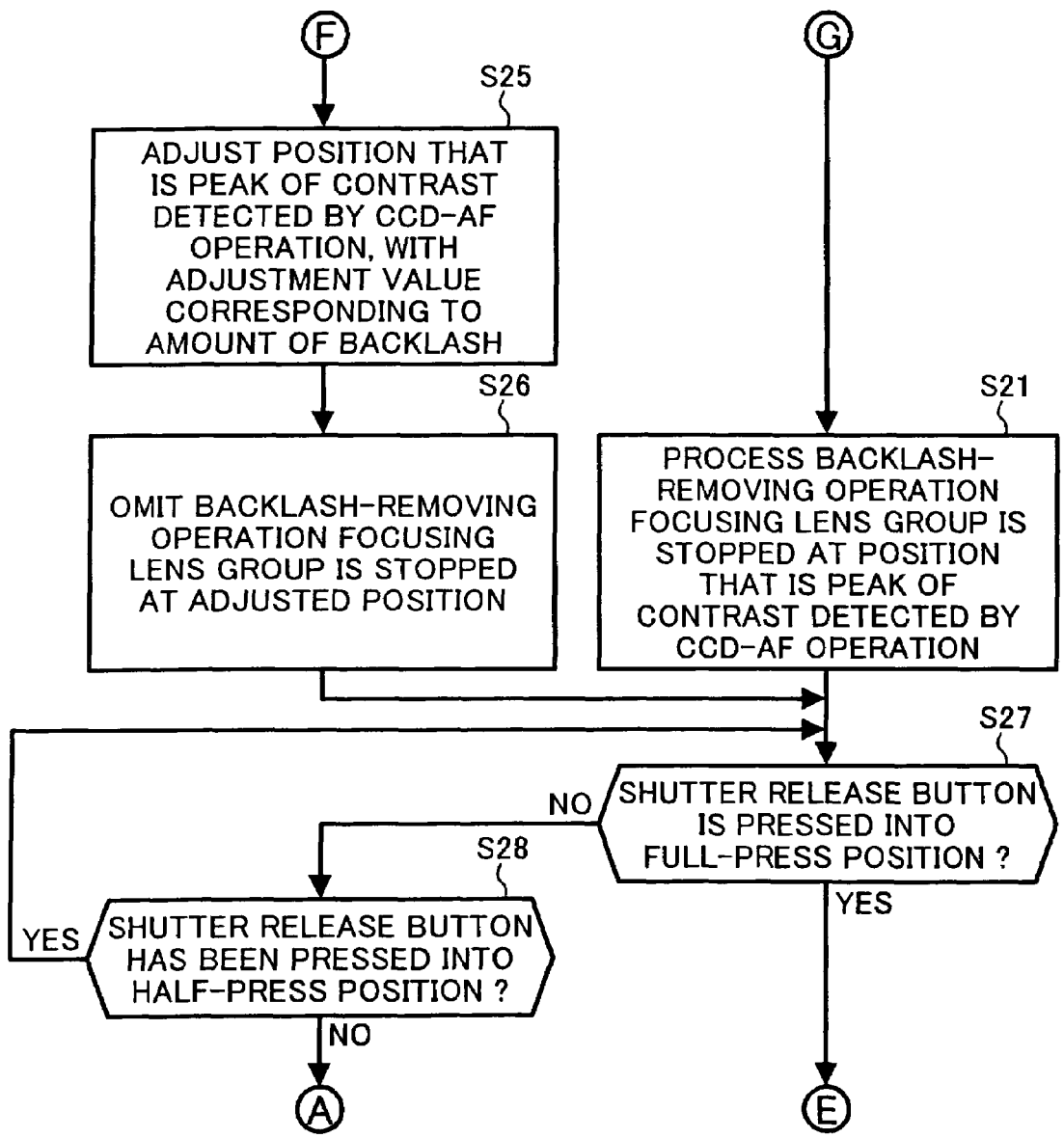

In addition, it is acceptable that standby-processing for detection of the full-press operation at step 27 (S27) is executed as parallel processing at the same time as between step 19 (S19) and step 26 (S26), though the step 27 (S27) is executed after execution of the step 26 (S26), as shown in FIG. 7. In this parallel processing, however, total processing of the digital camera 100 is configured as that processing after step 27 is not executed until the processing of step 26 is executed even if the full-press operation is detected at step 27 (S27). In this manner, the digital camera 100 can shorten total processing time so that the shooting processing (S29) is executed at the same time as completion of processing of the step 26 (S26).

Also, the focusing lens group 23 may reach to the driving-target position that is configured at step 6 (S6) or step 8 (S8) before determination of selecting the AF operation at step 10 (S10) and step 11 (S11) so that driving of the focusing lens group 23 is started at step 9 (S9). In this case, it is preferable that the selection of executing or omitting the backlash-removing operation by the AF control unit 50 is based on the determination of the shooting-mode at step 13 (S13) and the determination of the internal temperature at step 14 (S14).

Also, the image capture device of the present invention is not limited to the form described in this above-mentioned exemplary embodiments of the present invention. Namely, in an alternative embodiment, the whole of the shooting optical system 20 may be configured to be driven in order to execute the autofocus operation, though the digital camera 100 of the exemplary embodiment is configured to execute the autofocus operation by only driving of the focusing lens group 23 that is part of the shooting optical system 20. Also, in an alternative embodiment, the autofocus operation may be configured to execute by driving the CCD 11 and fixing the shooting optical system 20; or driving both of the CCD 11 and the shooting optical system 20.

In an alternative embodiment, the digital camera 100 may be configured to execute processing between range-finding processing (S4) and driving-start processing of the focusing lens group 23 (S9) by turning on the digital camera 100 by power switch 67 (S1), though the digital camera 100 of the present embodiment is configured to execute processing between step 4 (S4) and step 9 (S9) by detecting of the half-press operation (S2).

Those skilled in the art will recognize that the process steps describing a controller while expressed in terms of a hardware or firmware-based system is equally applicable to software-based systems (i.e., instruction set) running on a computer. This software may be embodied in a carrier, such as a magnetic or optical disc or a radio frequency or audio carrier wave. The software/hardware functionality of the invention is not necessarily performed in a time-series manner according to the order described in the flowcharts of FIGS. 5-7, and include a process performed in parallel or discrete manner (for example, a parallel process or an object-based process).

In this manner, it is preferable so that the digital camera 100 can shorten the elapsed time up to completion of driving of the focusing lens group 23 since actual detection of the half-press operation by starting the external-metering AF operation before detection of the half-press operation (S2).

Though the digital camera 100 of the exemplary embodiments of the present invention is configured to execute processing or omitting the backlash-removing operation based on the combination, as shown in FIGS. 8A and 8B, of the shooting-mode, the internal temperature of the digital camera 100 and the shutter-release-operation pattern to the shutter release button 81, the image capture device of the present invention is not limited to the form described in the exemplary embodiment of the present invention; in an alternative embodiment the digital camera 100 is configured to execute processing or omitting the backlash-removing operation based on only the shooting-mode as shown in FIGS. 9A and 9B, based on only the internal temperature of the digital camera 100 as shown in FIGS. 10A and 10B, or based on only the shutter-release-operation pattern to the shutter release button 8 as shown in FIGS. 11A and 11B.

In other words, in the embodiment as shown in FIGS. 9A and 9B, when the shooting-mode is determined as the draft mode shown as 'Combination (1) to (4)' in FIGS. 9A and 9B, the system controller 51 omits the backlash-removing operation. When the shooting-mode is detected as the normal mode shown as 'Combination (5) to (8)' in FIGS. 9A and 9B, the system controller 51 processes the backlash-removing operation. In this manner, when the shooting-mode is determined as the draft mode, the digital camera 100 can shorten the necessary time for completion of the focusing operation and the user can capture images according to the shooting-condition by omitting the backlash-removing operation so that shortening the necessary time for completion of the focusing movement is provided rather than improvement of focusing precision in the draft mode. Otherwise, when the shooting-mode is determined as the normal mode, the digital camera 100 can improve the focusing precision and the user can capture images according to the shooting-condition by processing the backlash-removing operation so that improvement of focusing precision is provided rather than shortening the necessary time for completion of the focusing movement in the normal mode.

In the embodiment as shown in FIGS. 10A and 10B, when the shooting-mode is determined as the draft mode shown as 'Combination (1), (2), (5) and (6)' in FIGS. 10A and 10B, the system controller 51 omits the backlash-removing operation. When the shooting-mode is determined as the normal mode shown as 'Combination (3), (4), (7) and (8)' in FIGS. 10A and 10B, the system controller 51 processes the backlash-removing operation. In this manner, when the internal temperature determined is within the normal temperature range with little effect against the performance of the external-metering AF and the range-finding operation, the digital camera 100 can keep the focusing precision at least partly even if the backlash-removing operation is not processed. Therefore, the digital camera 100 can shorten the necessary time for completion of the focusing operation and the user can capture images according to the shooting-condition by omitting the backlash-removing operation so that shortening the necessary time for completion of the focusing movement is provided rather than improvement of focusing precision in this case. Otherwise, when the internal temperature detected is outside of the normal temperature range with great effect against the performance of the external-metering AF and the range-finding operation, the digital camera 100 can improve the focusing precision and the user can capture images according to the shooting-condition by processing the backlash-removing operation so that improvement of focusing precision is provided rather than shortening the necessary time for completion of the focusing movement in this case.

In the embodiment as shown in FIGS. 11A and 11B, when the AF operation is determined as the external AF operation (includes driving to the fixed focus position) corresponding to the one-stroke-press operation shown as 'Combination (1), (3), (5) and (7)' in FIGS. 10A and 10B, the system controller 51 omits the backlash-removing operation. When the AF operation is determined as the CCD-AF operation (includes the hybrid AF operation) corresponding to the two-strokes-press operation shown as 'Combination (2), (4), (6) and (8)' in FIGS. 10A and 10B, the system controller 51 processes the backlash-removing operation. In this manner, when the shutter-release-operation pattern is for corresponding to the high-speed shutter-releasing operation (i.e., the AF operation is the external AF operation), the digital camera 100 can shorten the necessary time for completion of the focusing operation and the user can capture images according to the shooting-condition by omitting the backlash-removing operation so that shortening the necessary time for completion of the focusing movement is provided rather than improvement of focusing precision in this case. Otherwise, when the shutter-release-operation pattern is not for corresponding to the high-speed shutter-releasing operation (i.e., the AF operation is the CCD-AF operation), the digital camera 100 can improve the focusing precision and the user can capture images according to the shooting-condition by processing the backlash-removing operation so that improvement of focusing precision is provided rather than shortening the necessary time for completion of the focusing movement in this case.

In addition, the backlash-removing operation may be controlled based on any combination of the above-mentioned shooting-mode, internal temperature, shutter-releasing operation and AF operation.

As described above, the image capture device of the present invention can select processing or omitting the backlash-removing operation according to the shooting-condition. Therefore, when it is in the shooting-condition demanding high-speed shutter-releasing response, the digital camera 100 can shorten the necessary time for completion of the focusing operation and the user can capture images according to the shooting-condition by omitting the backlash-removing operation so that shortening the necessary time for completion of the focusing movement is provided rather than improvement of focusing precision. Otherwise, when it is in the shooting-condition that the focusing operation with high-precision is provided, the digital camera 100 can improve the focusing precision and the user can capture images according to the shooting-condition by processing the backlash-removing operation so that improvement of focusing precision is provided rather than shortening the necessary time for completion of the focusing movement.

Thus, the foregoing discussion discloses and describes merely an exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no invention subject material is dedicated to the public.

This Application claims the benefit of Japanese priority document JP 2003-190238, filed in Japan on Jul. 2, 2003, the contents of which is incorporated by reference herein in its entirety.

The invention claimed is:

1. An image capture device comprising:
a focusing means for focusing on an image area;
a focus driving means for driving said focusing means to a driving-target position;
a shooting-operation input means for receiving a command for a shooting operation;
an input-pattern detecting means for detecting an input-pattern of said shooting operation based on said received command; and
an autofocus control means for controlling driving of said focus driving means, said autofocus control means determining whether to execute or omit a backlash compensation based upon said detected input pattern, said backlash compensation operative to control driving direction of said focus driving means, and position the focusing means at a peripheral range of the driving-target position before driving-disactivation of said focus driving means, wherein
said shooting-operation input means has an initial position, a first position operated from said initial position by a first operation and a second position operated further from said first position by a second operation,
said input-pattern includes a first pattern and a second pattern, said first pattern is defined as that elapsed time from said first operation up to said second operation being less than a predetermined time, and said second pattern is defined as that said elapsed time equal to or more than said predetermined time, and
said autofocus control means omits said backlash compensation, when said input-pattern is said first pattern.

2. An image capture device comprising:
a focusing means for focusing on an image area;
a focus driving means for driving said focusing means to a driving-target position;
a shooting-operation input means for receiving a command for a shooting operation;
an input-pattern detecting means for detecting an input-pattern of said shooting operation based on said command received; and
an autofocus control means for controlling driving of said focus driving means, said autofocus control means determining whether to execute or omit a backlash compensation based upon said detected input pattern, said detected input pattern corresponding to a respective one of a plurality of autofocus operations, each one of said plurality of autofocus operations having a corresponding focus movement, said backlash compensation operative to control driving direction of said focus driving means to a predetermined direction, and position the focusing means at a peripheral range of the driving-target position before driving-disactivation of said focus driving means, wherein
said shooting-operation input means has an initial position, a first position operated from said initial position by a first operation and a second position operated more from said first position by a second operation,
said input-pattern includes a first pattern and a second pattern, said first pattern is defined as that elapsed time from said first operation up to said second operation is less than a predetermined time, and said second pattern is defined as that said elapsed time is equal to or more than said predetermined time, and
said autofocus control means selects an autofocus operation having the shortest processing time among said plurality of autofocus operations and omits said backlash compensation, when said input-pattern is said first pattern.

3. An image capture device comprising:
a focusing means for focusing on an image area;
a focus driving means for driving said focusing means to a driving-target position;
a shooting-mode selecting means for selecting one of a plurality of a shooting-modes alternatively;
a temperature-detecting means for detecting internal temperature of said image capture device;
a shooting-operation input means for receiving a command for initiating a shooting operation;
an input-pattern detecting means for detecting an input-pattern of said shooting operation based on said received command; and
an autofocus control means for controlling driving of said focus driving means, said autofocus control means determining whether to execute or omit a backlash compensation based upon a combination of said shooting-mode, said internal temperature and said input-pattern, said backlash compensation operative to control driving direction of said focus driving means into a predetermined direction, and position the focusing means at a peripheral range of the driving-target position before driving-disactivation of said focus driving means, wherein
said shooting-operation input means has an initial position, a first position operated from said initial position by a first operation and a second position operated more from said first position by a second operation,
said input-pattern includes a first pattern and a second pattern, said first pattern is defined as that elapsed time from said first operation up to said second operation is less than a predetermined time, and said second pattern is defined as that said elapsed time is equal to or more than said predetermined time, and
said autofocus control means omits said backlash compensation, when said input-pattern is said first pattern; said shooting-mode indicates a high-speed shutter-release response relative to the other of said plurality of shooting-modes; and said internal temperature is within a predetermined temperature range.

4. An image capture device comprising:
a focusing means for focusing on an image area;
a focus driving means for driving said focusing means to a driving-target position;
a shooting-mode selecting means for selecting one of a plurality of shooting-modes alternatively;
a temperature-detecting means for detecting internal temperature of said image capture device;

a shooting-operation input means for receiving a command for initiating shooting operation;

an input-pattern detecting means for detecting an input-pattern of said shooting operation based on said received command; and an autofocus control means for controlling driving of said focus driving means, said autofocus control means determining whether to execute or omit a backlash compensation based upon a combination of said shooting-mode, said internal temperature and said input-pattern, and controlling according to an autofocus operation selected alternatively from a plurality of autofocus operations having different focusing movements relative to each other based on said input-pattern detected, driving direction of said focus driving means to a predetermined direction, and positioning the focusing means at a peripheral range of the driving-target position before driving-disactivation of said focus driving means, wherein said shooting-operation input means has an initial position, a first position operated from said initial position by a first operation and a second position operated more from said first position by a second operation, said input-pattern includes a first pattern and a second pattern, said first pattern is defined as that elapsed time from said first operation up to said second operation is less than a predetermined time, and said second pattern is defined as that said elapsed time is equal to or more than said predetermined time, and said autofocus control means omits said backlash compensation, when said input-pattern is said first pattern; said autofocus operation having the shortest processing time among said plurality of autofocus operation; and said internal temperature is within predetermined temperature range including normal temperature.

5. An image capture device comprising:

a shooting optical system configured to project an image to an image area internal to said image capture device;

an image pickup unit configured to output an image signal corresponding to said image area by converting said image area to an electrical signal;

a focus-driving unit configured to drive one of said shooting optical system and said image pickup unit relative to the other up to a driving-target position;

a shooting-operation input unit configured to receive a command for a shooting operation;

an input-pattern detecting unit configured to detect an input-pattern of said shooting operation; and an autofocus control unit configured to determine whether to execute or omit a backlash compensation operative to control driving direction of said focus-driving unit into a predetermined direction and positioning the shooting optical system at a peripheral range of the driving-target position before driving-disactivation of said focus-driving unit based on said input-pattern detected, wherein said autofocus control unit controls said focus-driving unit based on said determination, said shooting-operation input unit has an initial position, a half-engaged position engaged from said initial position and a full-engaged position engaged more from said half-engaged position, said input-pattern detecting unit includes a half-engaged detecting unit, a full-engaged detecting unit, an elapsed time detecting unit and a release pattern detecting unit, said half-engaged detecting unit detects a half-engaged operation that said shooting-operation input unit is engaged into said half-engaged position, said full-engaged detecting unit detects a full-engaged operation that said shooting-operation input unit is pressed into said full-engaged position, said elapsed time detecting unit detects an elapsed time from said half-engaged operation up to said full-engaged operation, said release pattern detecting unit detects said input-pattern according to said elapsed time detected, and said autofocus control unit omits said backlash compensation, when said input-pattern based on said elapsed time thereof is less than a predetermined time.

6. An image capture device comprising:

a shooting optical system configured to project an image to an image area internal to said image capture device;

an image pickup unit configured to output an image signal corresponding to said image area by converting said image area to an electrical signal;

a focus-driving unit configured to drive one of said shooting optical system and said image pickup unit relative to the other up to a driving-target position;

a shooting-operation input unit configured to receive a command for shooting operation;

an input-pattern detecting unit configured to detect input-pattern of said shooting operation; and an autofocus control unit configured to determine whether to execute or omit a backlash compensation operative to control driving direction of said focus-driving unit into a predetermined direction and positioning the shooting optical system at a peripheral range of the driving-target position before driving-disactivation of said focus-driving unit based on an autofocus operation selected alternatively from a plurality of autofocus operations having different focusing movement relative to each other according to said input-pattern detected, wherein said autofocus control unit controls said focus-driving unit based on said determination, and wherein said shooting-operation input unit has an initial position, a half-engaged position engaged from said initial position and a full-engaged position engaged more from said half-engaged position, said input-pattern detecting unit includes a half-engaged detecting unit, a full-engaged detecting unit, an elapsed time detecting unit and a release pattern detecting unit, said half-engaged detecting unit detects a half-engaged operation that said shooting-operation input unit is engaged into said half-engaged position, said full-engaged detecting unit detects a full-engaged operation that said shooting-operation input unit is engaged into said full-engaged position, said elapsed time detecting unit detects elapsed time from said half-engaged operation up to said full-engaged operation, said release pattern detecting unit detects said input-pattern according to said elapsed time detected, and said autofocus control unit selects an autofocus operation having a shortest focus operation in terms of process time among said plurality of autofocus operation and omits said backlash compensation, when said elapsed time thereof is less than a predetermined time.

7. An image capture device comprising:

a shooting optical system configured to project a image to an image area internal to said image capture device;

an image pickup unit configured to output an image signal corresponding to said image area by converting said image area to an electrical signal;

a focus-driving unit configured to drive one of said shooting optical system and said image pickup unit relative to the other up to a driving-target position;
a shooting-mode selecting unit configured to select one of a plurality of shooting-mode alternatively;
a temperature-detecting unit configured to detect internal temperature of said image capture device;
a shooting-operation input unit configured to receive a command for shooting operation;
an input-pattern detecting unit configured to detect an input-pattern of said shooting operation; and
an autofocus control unit configured to determine whether to execute or omit a backlash compensation operative to control driving direction of said focus-driving unit into predetermined direction and positioning the shooting optical system at a peripheral range of the driving-target position before driving-disactivation of said focus-driving unit based on combination of said shooting-mode, said internal temperature and said input-pattern, wherein
said autofocus control unit controls said focus-driving unit based on said determination,
said shooting-operation input unit has an initial position, a half-engaged position engaged from said initial position and a full-engaged position engaged more from said half-engaged position,
said input-pattern detecting unit includes a half-engaged detecting unit, a full-engaged detecting unit, an elapsed time detecting unit and a release pattern detecting unit,
said half-engaged detecting unit detects a half-engaged operation that said shooting-operation input unit is engaged into said half-engaged position,
said full-engaged detecting unit detects a full-engaged operation that said shooting-operation input unit is engaged into said full-engaged position,
said elapsed time detecting unit detects elapsed time from said half-engaged operation up to said full-engaged operation,
said release pattern detecting unit detects said input-pattern according to said elapsed time detected, and
said autofocus control unit omits said backlash compensation, when said shooting-mode indicates high-speed shutter-release response relative to the other of said plurality of shooting-modes, said internal temperature is within a predetermined temperature range, and said input-pattern of said elapsed time thereof is less than a predetermined time.

8. An image capture device comprising:
a shooting optical system configured to project a image to a an image area internal to said image capture device;
an image pickup unit configured to output an image signal corresponding to said image area by converting said image area to an electrical signal;
a focus-driving unit configured to drive one of said shooting optical system and said image pickup unit relative to the other up to a driving-target position;
a shooting-mode selecting unit configured to select one of plurality of shooting-mode alternatively;
a temperature-detecting unit configured to detect an internal temperature of said image capture device;
a shooting-operation input unit configured to receive a command for a shooting operation;
an input-pattern detecting unit configured to detect an input-pattern of said shooting operation; and
an autofocus control unit configured to determine whether to execute or omit a backlash compensation operative to control a driving direction of said focus-driving unit into a predetermined direction and positioning the shooting optical system at a peripheral range of the driving-target position before driving-disactivation of said focus-driving unit based on combination of said shooting mode, said internal temperature and said input-pattern, wherein
said autofocus control unit controls said focus-driving unit based on said determination, according to autofocus operation selected from a plurality of autofocus operations having a different focusing movement relative to each other based on said input-pattern detected,
said shooting-operation input unit has an initial position, a half-engaged position engaged from said initial position and a full-engaged position engaged more from said half-engaged position,
said input-pattern detecting unit includes a half-engaged detecting unit, a full-engaged detecting unit, an elapsed time detecting unit and a release pattern detecting unit,
said half-engaged detecting unit detects a half-engaged operation that said shooting-operation input unit is engaged into said half-engaged position,
said full-engaged detecting unit detects a full-engaged operation that said shooting-operation input unit is engaged into said full-engaged position,
said elapsed time detecting unit detects elapsed time from said half-engaged operation up to said full-engaged operation,
said release pattern detecting unit detects said input-pattern according to said elapsed time detected, and
said autofocus control unit omits said backlash compensation, when said input-pattern indicates that said elapsed time thereof is less than a predetermined time, said autofocus operation time to process focus operation is shortest among said plurality of autofocus operation, and said internal temperature is within a predetermined temperature range.

9. A method to control an image capture device, comprising:
receiving a first command for initiating a shooting operation;
detecting an input-pattern of said shooting operation based on said received command;
determining whether or not to execute or omit backlash compensation based on said input-pattern detected, said backlash compensation operative to control a driving direction of a focus driving means into a predetermined direction at a peripheral range of a driving-target position;
controlling driving of said focus driving unit to drive said focusing unit in order to focus on an image area based on a result of said determining; and
receiving a second command for completing said shooting operation,
wherein omitting said backlash compensation, when said input-pattern indicates that elapsed time from receiving said first command up to receiving said second command is less than a predetermined time.

10. A method to control an image capture device, comprising:
receiving a first command for initiating a shooting operation;
detecting an input-pattern of said shooting operation based on said received command;
selecting an autofocus operation alternatively from a plurality of autofocus operations having different focusing movements relative to each other according to said input-pattern detected;

determining whether or not to execute or omit backlash compensation based on said autofocus operation selected, said backlash compensation operative to control a driving direction of a focus driving means into a predetermined direction at a peripheral range of a driving-target position;

controlling driving of said focus driving means to focus on an image area, based on a result of said determining and said autofocus operation selected;

receiving a second command for completing said shooting operation;

selecting an autofocus operation in which the time to process the corresponding focus operation is shortest among said plurality of autofocus operations; and omitting said backlash compensation, when said input-pattern indicates that an elapsed time from receiving said first command up to receiving said second command is less than a predetermined time.

11. A method to control an image capture device, comprising:

selecting one of a plurality of shooting-modes;

detecting an internal temperature of said image capture device;

receiving a first command for initiating a shooting operation;

detecting an input-pattern of said shooting operation based on said received command;

determining whether or not to execute or omit backlash compensation based on a combination of said shooting-mode selected, said internal temperature detected and said input-pattern detected, said backlash compensation operative to control a driving direction of a focus driving means into a predetermined direction at a peripheral range of a driving-target position;

controlling driving of said focus driving unit to drive said focusing unit in order to focus on an image area based on a result of said determining; and receiving second command for completing said shooting operation, wherein omitting said backlash compensation, when said input-pattern indicates that the elapsed time from receiving said first command up to receiving said second command is less than a predetermined time, said shooting-mode indicates high-speed shutter-release response relative to the other of said plurality of shooting-modes, and said internal temperature is within a predetermined temperature range.

12. A method to control an image capture device, comprising:

selecting one of a plurality of shooting-modes;

detecting an internal temperature of said image capture device;

receiving a first command for initiating a shooting operation;

detecting an input-pattern of said shooting operation based on said received command;

selecting an autofocus operation alternatively from a plurality of autofocus operations having a different focusing movement relative to each other according to said input-pattern detected;

determining whether or not to execute or omit backlash compensation based on a combination of said shooting mode selected, said internal temperature detected and said autofocus operation selected, said backlash compensation operative to control driving direction of a focus driving means into a predetermined direction at a peripheral range of a driving-target position;

controlling driving of said focus driving means to focus on an image area, based on a result of said determining; and receiving a second command for completing said shooting operation, wherein omitting backlash compensation when said input-pattern indicates that an elapsed time from receiving said first command up to receiving said second command is less than a predetermined time; said selected autofocus operation is an autofocus operation which has a shortest processing time among said plurality of autofocus operations; and said internal temperature is within a predetermined temperature range.

* * * * *